US008549098B2

(12) United States Patent
Aloni et al.

(10) Patent No.: US 8,549,098 B2
(45) Date of Patent: *Oct. 1, 2013

(54) METHOD AND SYSTEM FOR PROTOCOL OFFLOAD AND DIRECT I/O WITH I/O SHARING IN A VIRTUALIZED NETWORK ENVIRONMENT

(75) Inventors: Eliezer Aloni, Zur Yigal (IL); Uri El Zur, Irvine, CA (US); Rafi Shalom, Givat Shmuel (IL); Caitlin Bestler, Laguna Hills, CA (US)

(73) Assignee: Broadcom Israel Research, Ltd., Ramat Gan (IL)

( * ) Notice: Subject to any disclaimer, the term of this patent is extended or adjusted under 35 U.S.C. 154(b) by 1773 days.

This patent is subject to a terminal disclaimer.

(21) Appl. No.: 11/623,011

(22) Filed: Jan. 12, 2007

(65) Prior Publication Data
US 2007/0162572 A1    Jul. 12, 2007

Related U.S. Application Data

(60) Provisional application No. 60/758,581, filed on Jan. 12, 2006.

(51) Int. Cl.
*G06F 15/16*    (2006.01)
(52) U.S. Cl.
USPC .......................... 709/217; 709/203; 709/219
(58) Field of Classification Search
USPC ............................................ 709/203, 217, 219
See application file for complete search history.

(56) References Cited

U.S. PATENT DOCUMENTS

| | | | |
|---|---|---|---|
| 5,414,851 A | 5/1995 | Brice et al. | |
| 7,424,710 B1* | 9/2008 | Nelson et al. | 718/1 |
| 7,496,495 B2* | 2/2009 | Solomon et al. | 703/26 |
| 2005/0193137 A1* | 9/2005 | Farnham | 709/230 |
| 2006/0248528 A1* | 11/2006 | Oney et al. | 718/1 |
| 2007/0061492 A1* | 3/2007 | van Riel | 710/3 |
| 2007/0074192 A1* | 3/2007 | Geisinger | 717/148 |
| 2007/0162641 A1* | 7/2007 | Oztaskin et al. | 710/22 |
| 2008/0282241 A1* | 11/2008 | Dong | 718/1 |

OTHER PUBLICATIONS

International Preliminary Report on Patentability corresponding to International Application No. PCT/US2007/000992, dated Jul. 24, 2008, 8 pages.
Sugerman, J et al; "Virtualizing I/O devices on VMware Workstation's hosted virtual machine monitor" Proceedings of the Usenix Annual Technical Conference, Jun. 25, 2001, pp. 1-14, XP002322825.

(Continued)

*Primary Examiner* — Phuoc Nguyen
(74) *Attorney, Agent, or Firm* — Brinks Hofer Gilson & Lione

(57) ABSTRACT

Methods and systems for protocol offload and direct I/O with I/O sharing in a virtualized network environment are disclosed. Aspects of one method may include a plurality of GOSs sharing a single network interface circuitry, or a network interface card, (NIC) that may provide access to a network. The NIC may directly handle processing of data to be transmitted to the network and/or data received from the network for each of the GOSs without a TGOS for the GOSs handling the data to be transmitted to the network and/or data received from the network. The data may be copied directly from a buffer in the single NIC to an application buffer for one of the plurality of GOSs and/or directly from an application buffer for one of the plurality of GOSs to the buffer in the single NIC.

45 Claims, 12 Drawing Sheets

(56) References Cited

OTHER PUBLICATIONS

Barham, P et al; "Xen and the art of virtualization" ACM Sosp. Proceedings of the ACM Symposium on Operating Systems Principles, ACM, US, vol. 37, No. 5; Oct. 19, 2003, pp. 164-177; XP002370804.

Piyush, Shivam et al; "EMP: Zero-copy OS-bypass NIC-driven Gigabit Ethernet Message Passing" International Conference for High Performance Computing and Communications, ACM, US, Nov. 16, 2001, pp. 49-56, XP002360191.

Garfinkle, T et al; "Virtual Machine Monitors: Current Technology and Future Trends" Computer, IEEE Service Center, Los Alamitos, CA, US, vol. 38, No. 5, May 2005, pp. 39-47, XP011132222.

* cited by examiner

METHOD AND SYSTEM FOR PROTOCOL OFFLOAD AND DIRECT I/O WITH I/O SHARING IN A VIRTUALIZED NETWORK ENVIRONMENT

CROSS-REFERENCE TO RELATED APPLICATIONS/INCORPORATION BY REFERENCE

This application makes reference to, claims priority to, and claims benefit of U.S. Provisional Application Ser. No. 60/758,581 filed Jan. 12, 2006.

This application also makes reference to U.S. patent application Ser. No. 11/623,018 filed Jan. 12, 2007.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to network interfaces. More specifically, certain embodiments of the invention relate to a method and system for protocol offload and direct I/O with I/O sharing in a virtualized network environment.

BACKGROUND OF THE INVENTION

In networking systems, a single machine, for example, a server or a client, may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single physical machine may result in an improvement in server efficiency. However, consolidation also removes the level of protection that is provided when the operations are maintained separately. For example, when the operations are consolidated, a crash or failure in a database server may also result in the loss of email services, exchange services, and/or application services.

Another approach for improving server efficiency may be to utilize multiple operating systems running concurrently so that each operating system supports a different server operation or application or service, for example. The multiple operating systems may be referred to as guest operating systems (GOSs) or child partitions. This approach maintains the level of protection provided when server operations are not consolidated under a single operating system while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be needed to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance.

The NIC may be a hardware resource that is frequently utilized by at least one of the server operations or services. In this regard, a hypervisor or VM monitor may enable creating a software representation of NIC that may be utilized by a GOS. This software representation of the NIC may be referred to as a "virtual NIC." However, a virtual NIC may not be able to offer a full set of features or functionalities of the hardware NIC to a GOS. For example, a virtual NIC may only be able to provide basic layer 2 (L2) networking functionality to a GOS. The virtual NIC may be limited to providing data communication between a GOS and the network through another SW entity, such as a TGOS or VMK. In this regard, the virtual NIC may not be able to support other advanced features such as remote direct memory access (RDMA) and/or Internet small computers system interface (iSCSI), directly to the GOS for example. Due to the growing usage of multiple GOS in a single server, new solutions for alleviating the limitations of the virtual NIC may be desired.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for protocol offload and direct I/O with I/O sharing in a virtualized network environment, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
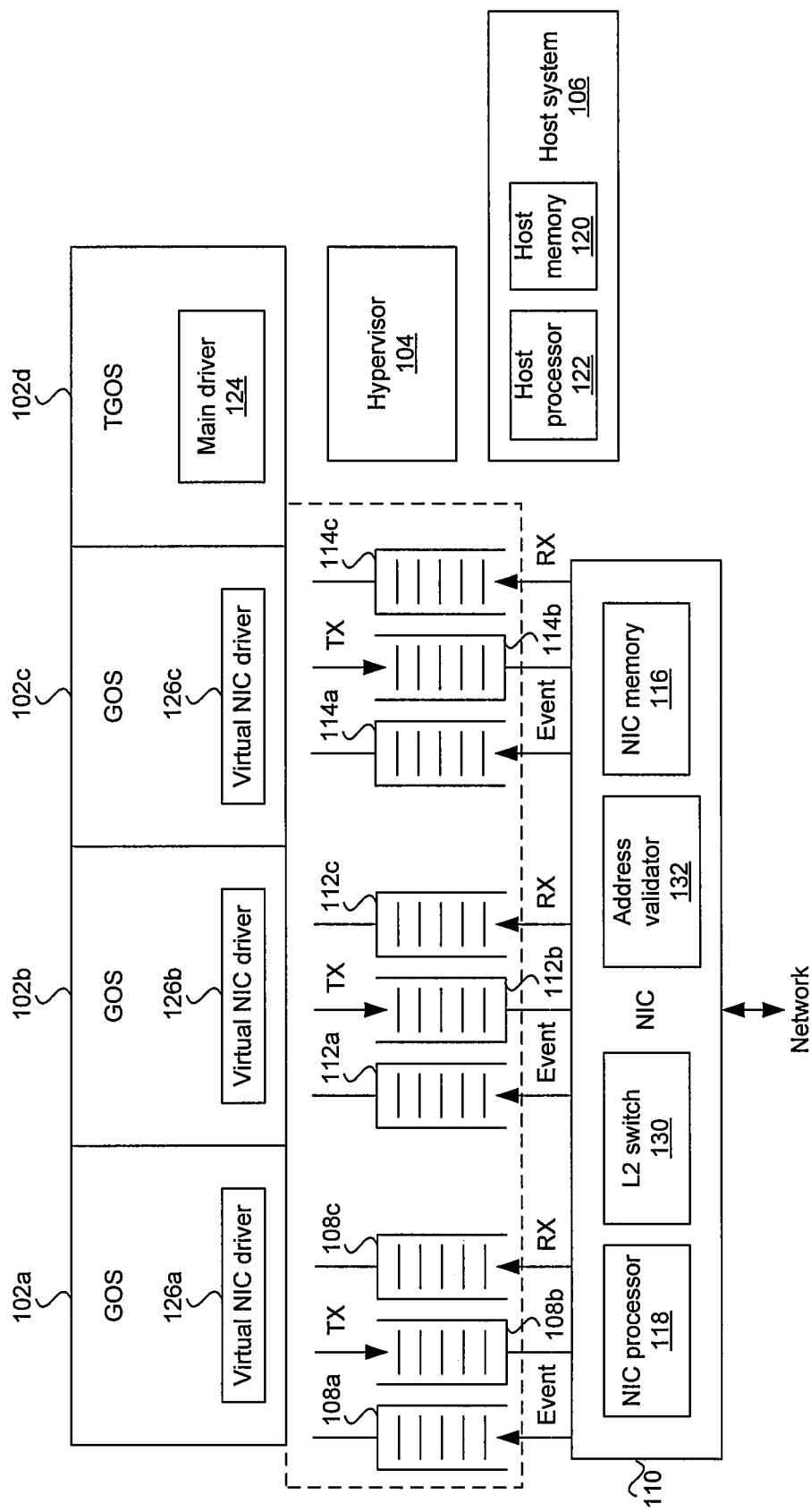
FIG. 1A is a block diagram of an exemplary NIC that supports level 2 (L2) switching and/or higher layer of switching for communication between GOSs in a host system, which may be utilized in connection with an embodiment of the invention.

Certain embodiments of the invention may be found in a method and system for protocol offload and direct I/O with I/O sharing in a virtualized network environment. Aspects of the method may comprise a plurality of GOSs sharing a single network interface circuitry or a network interface card (NIC) that provides access to a network. The single NIC may handle input/output processing for network access for each of the plurality of GOSs. The single NIC may directly handle processing of data to be transmitted to a network and/or data received from the network, without an intermediary, such as, for example, a trusted GOS (TGOS), a hypervisor, and/or a management utility that may interact with, for example, a PCI configuration space of the NIC for the plurality of GOSs handling processing of the data to be transmitted to the network and/or the data received from the network. The single NIC may copy data directly from a buffer for one of the plurality of GOSs to a buffer in the single NIC. The single NIC may also copy data directly from a buffer in the single NIC to a buffer for one of the plurality of GOSs. The source or destination buffer in the GOS may be a kernel buffer or application buffer. In some cases the data may be transferred directly to the application buffer in the GOS creating a zero copy similar to what is available in systems with non-virtualized I/O. In other cases this invention may allow reduction in overhead and number of copies that may be required to move the data to/from the GOS application buffer.

Communication between the single NIC and the plurality of GOSs may be switched, where the NIC may provide switching services, for example, similarly to an Ethernet switch at OSI protocol layer (L) 2 (L2) or 3 (L3) or higher layers, providing each GOS access to the physical network. The TGOS and/or a hypervisor may coordinate processing of requests from the plurality of GOSs. The TGOS may instruct the NIC to allocate resources per GOS, to identify addresses with a GOS and/or to assign or remove per GOS attributes, such as, for example, particular buffers or network bandwidth or priority settings (as in IEEE802.1P and 802.1Q for instance). In the process of initializing the system, the admin and/or configuration and/or management utilities transfer the information to TGOS. The TGOS configures the NIC 110 (potentially direct by use of PCI Configuration space) and the main driver 124. The information allows the NIC to determine general policies and services, for example, switching on/off, as well as per GOS resources, for example, a number of connections, and services, for example, L2, L4, or other protocol layers. The single NIC may access at least one buffer for at least one of the plurality of GOSs via a physical address communicated by the GOSs. The handling by the single NIC may comprise L3 protocol operations, L4 protocol operations, and/or L5 protocol operations. The handling by the single NIC may also comprise TCP operations and/or IP operations. The single NIC may also execute link layer network protocol operations.

Various architectures may refer to, for example, a GOS, TGOS, and hypervisor. Other architectures may refer to, for example, child partition, parent partition, and a hypervisor, or VM, VMK, and VMM. Still other architectures may refer to, for example, DomU, Dom0, and a hypervisor. It should be understood that a specific architecture is not a limiting factor with respect to this invention.

FIG. 1A is a block diagram of an exemplary NIC that supports level 2 (L2) switching and/or higher layer of switching for communication between GOSs in a host system, which may be utilized in connection with an embodiment of the invention. The switching supported by the NIC need not be limited to L2 only, it can be any combination of L2, VLAN, L3, L4, higher protocol layer and/or additional information including from the administrator as to how to perform the switching. Referring to FIG. 1A, there is shown GOSs 102a, 102b, and 102c, a TGOS 102d, a hypervisor 104, a host system 106, event queues 108a, 112a, and 114a, transmit (TX) queues 108b, 112b, and 114b, receive (RX) queues 108c, 112c, and 114c, and a NIC 110. The TGOS 102d, may comprise a main driver 124. The host system 106 may comprise a host processor 122 and a host memory 120. The NIC 110 may comprise a NIC processor 118, a NIC memory 116, a L2 switch 130, and a physical address validator 132.

The host system 106 may comprise suitable logic, circuitry, and/or code that may enable data processing and/or networking operations, for example. In some instances, the host system 106 may also comprise other hardware resources such as a graphics card and/or a peripheral sound card, for example. The host system 106 may support the operation of the GOSs 102a, 102b, and 102c, via the hypervisor 104. The GOSs 102a, 102b, and 102c, may each correspond to an operating system that may enable the running or execution of operations or services such as applications, email server operations, database server operations, and/or exchange server operations, for example. The number of GOSs that may be supported by the host system 106 by utilizing the hypervisor 104 need not be limited to any specific number. For example, one or more GOSs may be supported by the host system 106. Internal switching may occur between GOSs or between a GOS and the TGOS.

The hypervisor 104 and/or the TGOS 102d, may operate as a software layer that may enable OS virtualization of hardware resources in the host system 106 and/or virtualization of hardware resources communicatively connected to the host system 106, such as the NIC 110, for example. The hypervisor 104 and/or the TGOS 102d, may allocate hardware resources and also may enable data communication between the GOSs and hardware resources in the host system 106 and/or hardware resources communicatively connected to the host system 106. For example, the hypervisor 104 may enable communication between the GOSs supported by the host system 106 and the NIC 110 via the event queues 108a, 112a, and 114a, the TX queues 108b, 112b, and 114b, and/or the RX queues 108c, 112c, and 114c. In this regard, communication between the first GOS 102a and the NIC 110 may occur via the event queue 108a, the TX queue 108b, and the RX queue 108c. Similarly, communication between the second GOS 102b, and the NIC 110 may occur via the event queue 112a, the TX queue 112b, and the RX queue 112c. Communication between the third GOS 102c, and the NIC 110 may occur via the event queue 114a, the TX queue 114b, and the RX queue 114c. In this regard, each set of queues may operate separately and independently from the others. In this sense when a relevant GOS is engaged in network transmission or reception, data may travel directly to/from the NIC after the TGOS 102d, has allocated the queues, internal resources required on the NIC, consulted with the configuration and administrative information.

The TGOS 102d, may comprise a main driver 124 that may coordinate the transfer of data between the GOSs and the queues. The main driver 124 may communicate with the virtual NIC driver 126a in the GOS 102a, the virtual NIC driver 126b in the GOS 102b, and/or the virtual NIC driver 126c in the GOS 102c. Each virtual NIC driver may correspond to a portion of a GOS that may enable transfer of data between the operations or services performed by the GOSs and the appropriate queues via the main driver 124. For example, packets and/or descriptors of packets for transmission from an operation or service in the first GOS 102a may be transferred to the TX queue 108b by the Virtual NIC driver 126a. In another example, data posted to the event queue 108a, to indicate a network condition or to report data transmission or data reception by the NIC 110, may be transferred to a buffer posted by the virtual NIC driver 126a. In another example, packets received by the NIC 110 from the network that have a MAC address or other address or attribute that may correspond to the first GOS 102a may be transferred from the RX queue 108c to a buffer posted by the virtual NIC driver 126a.

The host processor 122 may comprise suitable logic, circuitry, and/or code that may enable control and/or management of the data processing and/or networking operations associated with the host system 106. The host memory 120 may comprise suitable logic, circuitry, and/or code that may enable storage of data utilized by the host system 106. The host memory 120 may be partitioned into a plurality of memory portions. For example, each GOS supported by the host system 106 may have a corresponding memory portion in the host memory 120. Moreover, the hypervisor 104 may have a corresponding memory portion in the host memory 120. In this regard, the hypervisor 104 and/or the TGOS 102d, may enable data communication between GOSs by controlling the transfer of data from a portion of the memory 120 that corresponds to one GOS to another portion of the memory 120 that corresponds to another GOS.

The NIC 110 may comprise suitable logic, circuitry, and/or code that may enable communication of data with a network. The NIC 110 may enable basic L2 switching, VLAN based switching, TCP offload, iSCSI, and/or RDMA operations, for example. The NIC 110 may be referred to an OS virtualization-aware NIC because communication with each GOS occurs by an independent set of queues. The NIC 110 may determine the right address or combination of address information, such as, for example, VLAN address, L3 address, L4 address, L4 port, among others, to be used in order to select the right target GOS. For instance, the NIC 110 may determine the MAC address of received packets and may transfer the received packets to the RX queue that corresponds to the GOS with the appropriate MAC address. Similarly, the NIC 110 may enable transfer of packets from the GOSs to the network by coordinating and/or arbitrating the order in which packets posted for transmission in the TX queues may be transmitted. In this regard, the NIC 110 is said to enable direct input/output (I/O) or hypervisor bypass operations.

Some embodiments of the invention may comprise the NIC 110 that may allow validation, correction, and/or generation of, for example, MAC addresses or VLAN tags or IP addresses or attributes like TOS bits. For example, the NIC 110 may detect that a GOS may request a packet to be sent with a wrong source MAC address. The NIC 110 may validate a source MAC address by, for example, comparing the source MAC address for a packet with MAC addresses that may be associated with specific GOS or buffers, and/or packet types. The NIC 110 may flag the wrong source MAC address as an error to the TGOS and/or to the GOS, and may discard the packet. Another embodiment of the invention may enable the NIC 110 to overwrite the incorrect parameter or attribute, for example, the source MAC address for the packet from a GOS with a correct source MAC address, and proceed with transmitting the packet. Similarly, another embodiment of the invention may generate an appropriate source MAC address for each packet from the GOSs without validating the source MAC address. Accordingly, an application program running on a GOS may not need to generate a source MAC address as the NIC 110 may write the source MAC address. The NIC 110 may also monitor use of bandwidth and/or priority per GOS. The NIC 110 may, for example, allocate bandwidth limits or frames per GOS, and/or ensure that GOS or applications or flows associated with a GOS do not claim priority different than that assigned by the administrator and/or TGOS.

The event queues 108a, 112a, and 114a may comprise suitable logic, circuitry, and/or code that may enable posting of data by the NIC 110 to indicate the occurrence of an event. For example, the NIC 110 may post data in the event queues to indicate that the link is down or that the link is up. The current status of the link, whether it is up or down, may be posted to all the event queues, for example.

The TX queues 108b, 112b, and 114b may comprise suitable logic, circuitry, and/or code that may enable posting of data for transmission via the NIC 110 from the GOSs 102a, 102b, and 102c, respectively. The RX queues 108c, 112c, and 114c may comprise suitable logic, circuitry, and/or code that may enable posting of data received via the NIC 110 for processing by the GOSs 102a, 102b, and 102c, respectively. The TX queues 108b, 112b, and 114b and/or the RX queues 108c, 112c, and 114c may be integrated into the NIC 110, for example. The queues may reside in host memory 120, in the NIC 110 or in a combination of host memory 120 and NIC 110.

The NIC processor 118 may comprise suitable logic, circuitry, and/or code that may enable control and/or management of the data processing and/or networking operations in the NIC 110. The NIC memory 116 may comprise suitable logic, circuitry, and/or code that may enable storage of data utilized by the NIC 110. The NIC 110 may be shared by a plurality of GOSs 102a, 102b, and 102c. In some embodiments of the invention, network protocol operations may be offloaded to the NIC 110 and handled by the NIC 110. The offloaded network protocol operations may comprise OSI layer 3, 4, and/or 5 protocol operations, such as, for example, TCP and/or IP operations. The NIC may also execute link layer network protocol operations, which may be, for example, OSI layer 2 protocol operations, for example, a VLAN.

Accordingly, the NIC 110 may be a shared resource for the plurality of GOSs. The operations of the GOSs and the NIC may be coordinated by a TGOS and a hypervisor. Operation of a GOS and a NIC may comprise copying data between a GOS and the NIC. This may be accomplished by the NIC when the GOS communicates to the NIC an address of a buffer or a reference to an address of a buffer to be accessed in that GOS. The address may be a physical address or a virtual address. A virtual address may be translated to a physical address via, for example, an address translation table or a memory management unit. The means of address translation may be design and/or implementation dependent.

The L2 switch 130 may comprise suitable logic, circuitry, and/or code that may enable the NIC 110 to support packet communication between a GOS and the network and/or between GOSs, for example. Placing switching functionality in the NIC 110 may, for example, reduce end-to-end latency when transmitting or receiving packets. The L2 switch 130 may support unicast, broadcast, and/or multicast operations. Unicast operations may refer to packet transmissions to a single MAC address. Broadcast operations may refer to packet transmissions to all MAC addresses. Multicast operations may refer to packet transmission to a particular group of MAC addresses.

For example, the GOS 102a may send a packet to at least one device communicatively coupled to the network. In this instance, the virtual NIC driver 126a may transfer the packet to the TX queue 108b corresponding to the GOS 102a. The L2 switch 130 may receive the packet from the TX queue 108b and may determine that the destination MAC address or addresses correspond to a device or devices on the network. The NIC 110 may then communicate the packet to the network.

In another example, the GOS 102a may have a data packet to transmit to the GOS 102b, and/or the GOS 102c. In this instance, the virtual NIC driver 126a may place the data packet on the TX queue 108b corresponding to the GOS 102a. The L2 switch 130 may receive the data packet from the TX queue 108b and may determine that the destination MAC address may correspond to the GOS 102b. The NIC 110 may place, for example, the data packet in to the RX queue 112c corresponding to the GOS 102b. The virtual NIC driver 126b may be notified of the data packet in the RX queue 112c via the event queue 112a, and the virtual NIC driver 126b may copy the data packet for use by an application program on the GOS 102b.

The NIC 110 may also comprise the physical address validator 132. The physical address validator 132 may comprise suitable logic, circuitry, and/or code that may enable the validation of the address of a buffer posted by a virtual NIC driver to store a received packet. For example, before a packet in a RX queue is transferred to a posted buffer, the physical address validator 132 may validate that the posted buffer is in an address or memory location that corresponds to the GOS associated with the received packet. When the address is validated, the received packet may be transferred from the RX queue to the posted buffer. If the physical address cannot be validated, the NIC 110 may notify, for example, the TGOS and/or the hypervisor and/or the main driver 124 and/or virtual NIC driver 126a. Accordingly, the virtual NIC driver 126a may post a new buffer to receive the packet from the RX queue or another action such as bringing down the virtual drive may be taken by the TGOS and/or hypervisor. Similar validation for transmit buffer addresses can be performed by the NIC. Various embodiments of the invention utilizing the GOS and the hypervisor may be described with respect to FIGS. 2A, 2B, 2C, 3A, 3B, 3C, 4A, 4B, and 4C.

Figure 1B:
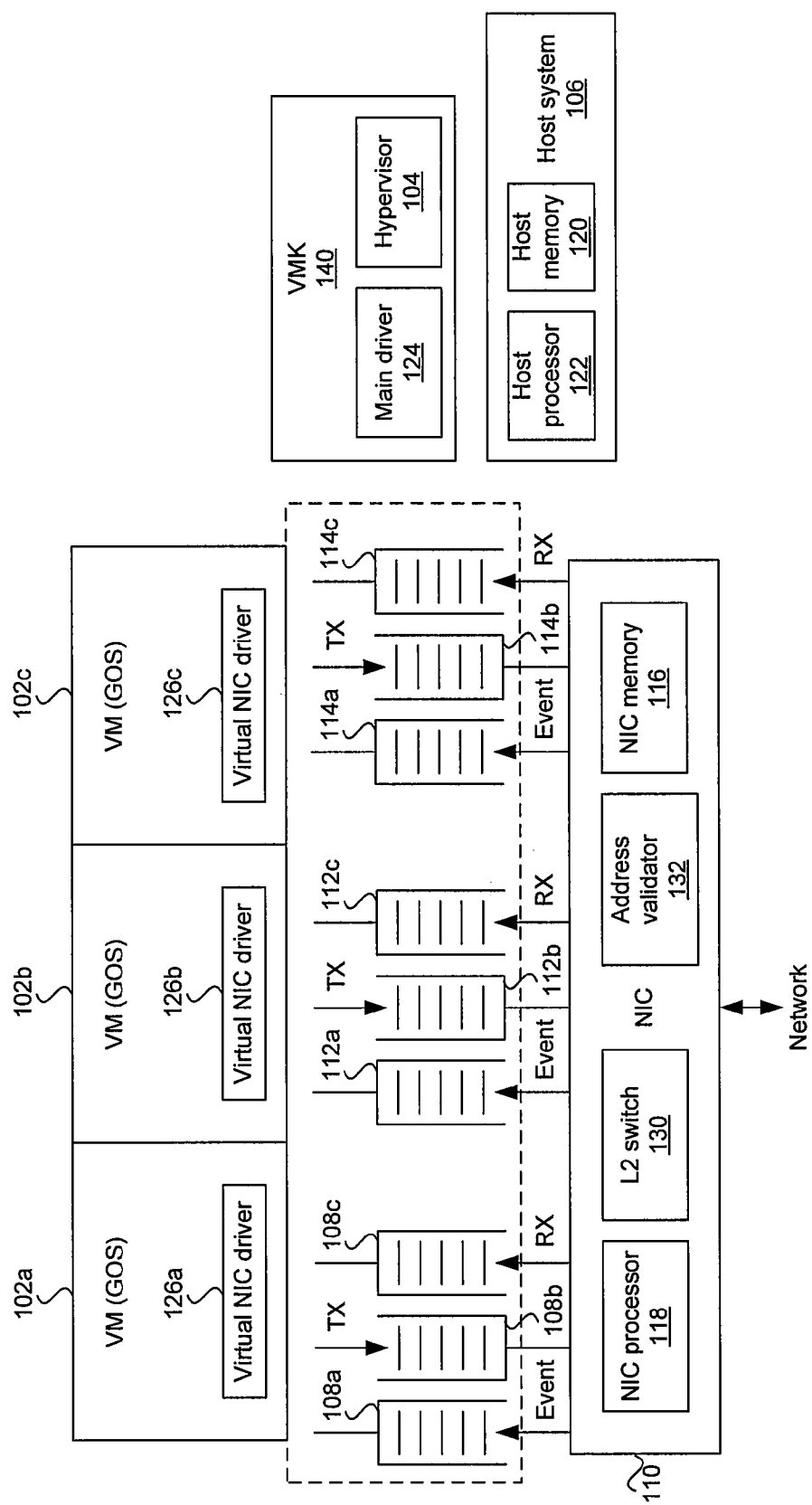
FIG. 1B is a block diagram of an exemplary NIC that supports level 2 (L2) switching and/or higher layer of switching for communication between GOSs in a host system, which may be utilized in connection with an embodiment of the invention.

FIG. 1B is a block diagram of an exemplary NIC that supports level 2 (L2) switching and/or higher layer of switching for communication between VMs, in a host system, which may be utilized in connection with an embodiment of the invention. FIG. 1B may be similar to the FIG. 1A in many respects. For example, a VM may comprise similar functionality as a GOS. However, the FIG. 1B may not have the TGOS 102d. The FIG. 1B may comprise, however, a VM kernel (VMK) 140, which may comprise the main driver 124 and the hypervisor 104. Accordingly, the functionality of the VMK 140 in FIG. 1B may be similar to the functionality of the TGOS 102d, and/or the hypervisor 104 in FIG. 1A.

Figure 1C:
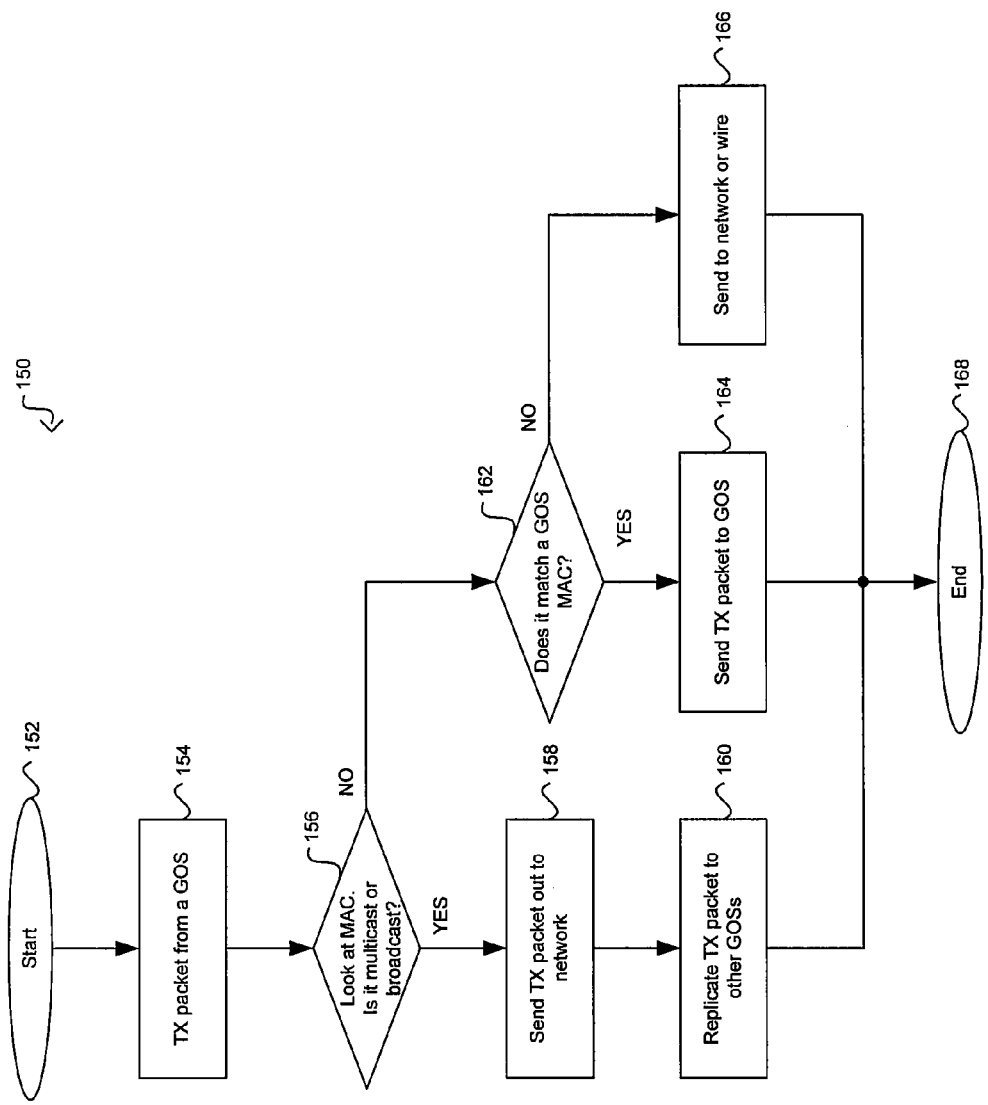
FIG. 1C is a flow diagram illustrating exemplary steps for transmitting to a network via a NIC, which may be utilized in connection with an embodiment of the invention.

FIG. 1C is a flow diagram illustrating exemplary steps for transmitting to a network via a NIC, which may be utilized in connection with an embodiment of the invention. Referring to FIG. 1C, there is shown a flow diagram 150. After start step 152, in step 154, a packet may be generated for transmission by a GOS supported by the host system 106 in FIG. 1A. The Virtual NIC driver may transfer the packet to the appropriate TX queue. The L2 switch 130 in FIG. 1A may receive the packet from the TX queue and may determine the destination MAC address or addresses. In step 156, based on the MAC address or address corresponding to the destination of the packet, the L2 switch 130 may determine whether the packet transmission is to be a unicast, a broadcast, or a multicast. When the packet transmission is a multicast or a broadcast, the process of the flow diagram 150 may proceed to step 158.

In step 158, the L2 switch 130 may transfer the packet to the appropriate MAC addresses on the network that are listed as part of the multicast or broadcast transmission. In step 160, the L2 switch 130 may also transfer the packet to the RX queue of each GOS with a MAC address listed as part of the multicast or broadcast transmission. The virtual NIC driver for each of the GOSs listed may be notified of the received packet and may copy the received packet to a posted buffer in the appropriate portion of the host memory 120. The operation or service executing on each of the GOSs listed may read the received packet from the posted buffer, for example. After step 160, the process of the flow diagram 150 may proceed to end step 168.

Returning to step 156, when the packet is to be a unicast address, the process of the flow diagram 150 may proceed to step 162. In step 162, the L2 switch 130 may determine whether the MAC address corresponds to a GOS supported by the host system 106 or to a device on the wire or network. When the MAC address of the packet to be transmitted corresponds to a GOS, the process of the flow diagram 150 may proceed to step 164. In step 164, the L2 switch 130 may transfer the packet to the RX queue that corresponds to the GOS with the appropriate MAC address. The Virtual NIC driver may be notified of the received packet and may post a buffer in the appropriate portion of the host memory 120. The operation or service executing on the GOS may read the received packet from the posted buffer, for example. After step 164, the process of the flow diagram 150 may proceed to end step 168.

Returning to step 162, when the MAC address of the packet to be transmitted corresponds to a device on the network, the process of the flow diagram 150 may proceed to step 166. In step 166, the L2 switch 130 with the NIC 110 assistance may transfer the packet to the appropriate MAC address on the network. After step 166, the process of the flow diagram 150 may proceed to end step 168.

The OS virtualization-aware NIC described herein may enable OS virtualization that reduces the overhead requirements of the hypervisor layer for communication of packets between a GOS and the network and/or between GOSs. The OS virtualization-aware NIC may support a plurality of GOSs. Moreover, the OS virtualization-aware NIC may enable the virtualization of advanced features such as TCP offload functions, RDMA, and/or iSCSI interfaces, for example. Embodiments of the invention that enable reduction of latency for work requests may be described with respect to following figures. A work request, which may be placed on one of the TX queues as a WQE, for example, may be generated by a GOS in order to transfer data from an application program buffer directly to the NIC 110 and from there to a network.

Figure 2A:
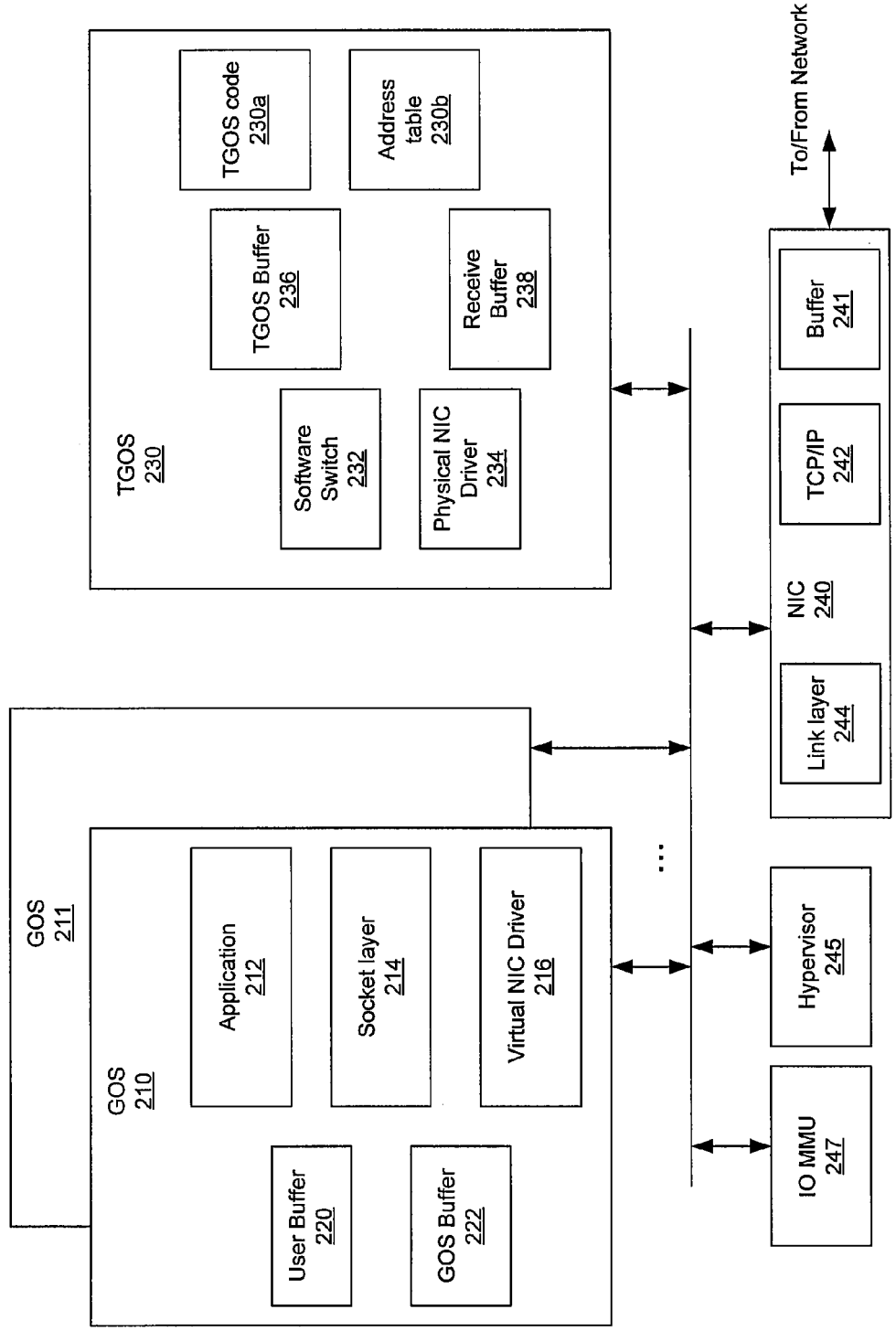
FIG. 2A is a block diagram illustrating exemplary GOS protocol offload functionality by the NIC with I/O sharing, using the TGOS as an intermediary between the GOS and the NIC, in accordance with an embodiment of the invention.

FIG. 2A is a block diagram illustrating exemplary protocol offload functionality with I/O sharing, in accordance with an embodiment of the invention. Referring to FIG. 2A, there is shown a GOS 210, a TGOS 230, a NIC 240, a hypervisor 245, and an I/O memory management unit (I/O MMU) 247. The GOS 210 may comprise an application layer 212, a socket layer 214, and a virtual NIC driver 216. A user buffer 220 and a GOS buffer 222 may be allocated, for example, by the GOS 210, the TGOS 230, and/or the hypervisor 245, for use by the GOS 210. Accordingly, the user buffer 220 and the GOS buffer 222 may be a logical part of the GOS 210. The GOS 210 may be similar to the GOS 102a, 102b, or 102c, described with respect to FIG. 1A. A plurality of GOSs may share a common resource, for example, the NIC 240.

The application layer 212 may comprise, for example, an application program for email service or a web-browsing program. The socket layer 214 may comprise suitable code that may enable transfer of data from the application layer 212 to lower layers, such as, for example, TCP/IP layers, and vice versa. The virtual NIC driver 216 may comprise suitable code that may allow transfer of data from the GOS 210 to the NIC 240 and vice versa. The user buffer 220 and the GOS buffer 222, which may be used by the GOS 210, may be a part of the host memory 120, for example.

The TGOS 230 may comprise suitable logic, circuitry, and/or code that may enable support of a plurality of GOSs that transmit and/or receive data from the network. The TGOS 230 may comprise a software switch 232, a physical NIC driver 234, TGOS code 230a, and an address table 230b. A TGOS buffer 236 and a receive buffer 238 may be allocated, for example, by the TGOS 230 and/or the hypervisor 245, for use by the TGOS 230. Accordingly, the TGOS buffer 236 and the receive buffer 238 may be a logical part of the TGOS 210.

The software switch 232, which may be similar to the L2 switch 130, may comprise suitable code that may allow routing of data from one of a plurality of GOSs to the NIC 240, and vice versa. Accordingly, the NIC 240 may be shared by various GOSs. The physical NIC driver 234 may comprise suitable code that may allow data to be transferred to and/or from the NIC 240.

The TGOS buffer 236 may be used to store data from the GOS 210 and/or data from the NIC 240. The TGOS buffer 236 may be part of the host memory 120, for example. The receive buffer 238 may be used to hold data from the NIC 240. The receive buffer 238 may be, for example, a part of the host memory 120 or the receive buffer 238 may be a hardware buffer.

The TGOS code 230a may, for example, enable allocation of buffers for use by the GOSs. The address table 230b may enable translation of an offset index or a virtual address for a buffer to a physical address for the buffer. U.S. patent application Ser. No. 11/623,018 filed Jan. 12, 2007 illustrates an exemplary address translation table. The address translation table 230b may comprise addresses for a pool of buffers, where the buffers may be part of the host memory 120, for example. In other embodiments of the invention, the address translation table may not be available to a GOS, but may be available to the TGOS 230, for example, as well as to the hypervisor 245 and the I/O MMU 247 or to the hypervisor and the I/O MMU only. While an address translation table may have been described for address translation, the invention need not be so limited. A specific means of address translation may be design and/or implementation dependent.

The NIC 240 may comprise suitable logic, circuitry, and/or code that may process data from an application layer for transmission to a network, or receive data from the network to an application layer. The NIC 240 may also comprise a NIC buffer 241, L5 for the RDMA or iSCSI or other session layer and/or higher layer code, a hardware resident TCP/IP layer block 242, and a link layer block 244. The NIC buffer 241 may be used to store data that may be received from the network and/or data that may be transmitted to the network. The NIC buffer 241 may be similar, for example, to the TX queues 108b, 112b, and 114b, and the RX queues 108c, 112c, and 114c. The TCP/IP layer block 242 may comprise suitable logic, circuitry, and/or code that may be utilized to process data transmitted and/or received from the network with respect to TCP/IP protocols. The link layer block 244 may comprise suitable logic, circuitry, and/or code that may be utilized, for example, for processing data for Ethernet link layer protocol before being transmitted and/or after being received from the network.

The hypervisor 245 may comprise suitable logic, circuitry, and/or code that may enable coordinating control of data being received and transmitted from the network, and for allocation of resources. Some embodiments of the invention may comprise the hypervisor 245 in coordination with a TGOS, for example. Resources allocated may comprise, for example, various buffers for the plurality of GOSs and TGOS, and the NIC 240. For example, the buffers may be allocated at power up from the host memory 120 and/or dynamically from the host memory 120 while the GOS 210, the TGOS 230, and/or the hypervisor 245 may be operating. The hypervisor 245 may receive requests for buffers from the GOS via, for example, the socket layer 214 and may route the received requests to the TGOS 230. The TGOS 230 may then allocate a buffer. The TGOS 230 may send address or a reference to the address of the allocated buffer to the hypervisor 245. The hypervisor 245 may then communicate the address of the allocated buffer to the socket layer 214. In order to isolate memory resources allocated to one GOS from another GOS, the memory communicated to the GOS may be a virtual address or an address referred to as bus address or DMA address or device address that may need to be translated to a physical memory address. Alternatively, the TGOS 230 may send an offset index to the buffer, and the offset index may be communicated to the socket layer 214.

The I/O MMU 247 may comprise suitable logic, circuitry, and/or code that may enable translation of virtual address or an address referred to as bus address or DMA address or device address to a physical address when set up to translate for specific virtual address ranges. Accordingly, a device, for example, the NIC 240 may attempt to address a memory location with a virtual memory address or an address referred to as bus address or DMA address or device address. For simplicity the rest of the text refers to these addresses as a virtual address, although these addresses may differ from the virtual address used by the GOS. The virtual memory address may be intercepted by the I/O MMU 247, and the I/O MMU 247 may translate the virtual memory address to a physical memory address. The I/O MMU 247 may output the physical memory address to, for example, an address bus coupled with the host system memory. In turn the memory may produce the content for a read operation or store it for a write operation. Accordingly, for a read operation the NIC 240 may then read the data at the location of the physical memory address. Alternatively, the NIC 240 may request that the I/O MMU 247 send the translated physical address to the NIC 240. The NIC 240 may then access the physical address location directly by using the physical address from the I/O MMU 247.

In operation, the application layer 212 in the GOS 210 may have data to be transmitted to the network. The data may be, for example, in the user buffer 220. The data may be copied from the user buffer 220 to the GOS buffer 222 by, for example, the socket layer 214. The socket layer 214 may request a buffer from, for example, its OS for use as the GOS buffer 222 if there is not a buffer available for use as the GOS buffer 222. If the OS is resource limited and virtualization aware, the OS may request support from the TGOS. Mapping and pinning of buffers by a TGOS in some embodiments of the invention is described with respect to FIG. 4B. The socket layer 214 may indicate to the virtual NIC driver 216 the address of the GOS buffer 222.

In one embodiment of the invention, the GOS may communicate to the NIC via the TGOS. The virtual NIC driver 216 may provide an interface for transferring the data in the GOS buffer 222 to the TGOS 230 via the hypervisor 245. This may include, for example, the address of the GOS buffer 222. Accordingly, the hypervisor 245 may copy the data in the GOS buffer 222 to the TGOS buffer 236 that may correspond to the GOS 210. The data may include, for example, reference to a particular network connection. The hypervisor 245 may then invoke the TGOS 230. The software switch 232 may post information about the data in the TGOS buffer 236 to, for example, the physical NIC driver 234. The information may comprise, for example, an address of the TGOS buffer 236 and/or which network connection the data may correspond to. The network connection information along with the GOS identity may allow the NIC 240 to process the data appropriately when several applications may each have one or more open network connection.

The physical NIC driver 234 may communicate this information to the NIC 240. If the address for the TGOS buffer 236 is a physical address, the NIC 240 may use the physical address to transfer data from the TGOS buffer 236 to, for example, to the NIC buffer 241. The data transfer may occur via, for example, a programmed I/O or DMA transfer to the NIC buffer 241. If the buffer address is not a physical address the NIC 240 may, for example, search the address translation table 230b to find a corresponding physical address. Access to the GOS buffer 322 by the NIC 240 is described in U.S. patent application Ser. No. 11/623,018 filed Jan. 12, 2007.

The TCP/IP layer block 242 in the NIC 240 may segment the data from the TGOS 230 to a plurality of packets, and encapsulate the segmented data to be transmitted with appropriate TCP/IP information. The encapsulated data from the TCP/IP layer block 242 may then be encapsulated with appropriate link layer information by the link layer block 244. The packet from the link layer block 244 may be transmitted on to the network by the NIC 240.

Additionally, the NIC 240 may receive a packet from the network. The received data may be processed and stored, for example, in the NIC buffer 241. The link layer block 244 may parse the link layer information from the received packet. If the link layer block 244 determines that the packet reached the correct NIC, the link layer information may be removed. Otherwise, the link layer block 244 may discard the received packet. The link layer block 244 may parse information in the Ethernet header in order to determine whether a plurality of Ethernet packets may be reassembled to form an IP packet. The link layer block 244 may receive and reassemble a plurality of the Ethernet packets to form one IP packet, which may be communicated to the TCP/IP layer block 242.

The TCP/IP layer block 242 may determine if a plurality of IP packets may be reassembled to form a TCP packet. If so, the TCP/IP layer block 242 may receive and reassemble a plurality of the IP packets to form one TCP packet. The resulting TCP packet may be processed by the TCP/IP layer block 242 to form a data packet. The processing may comprise removing a TCP header. The NIC 240 may also determine which particular GOS should be the recipient of the received data, by using the address information in the packet to assist in relating incoming frames to a particular GOS. The particular GOS may be notified of the received data by the NIC 240 when the NIC 240 places an event in, for example, the event queue 108a, 112a, or 114a.

The physical NIC driver 234 may communicate with the NIC 240 to control the transfer of the data in, for example, the NIC buffer 241 to the receive buffer 238. For example, the physical NIC driver 234 may communicate address of the receive buffer 238. If the address for the receive buffer 238 is a physical address, the NIC 240 may use the physical address to transfer data from the NIC buffer 241 to the receive buffer 238. Otherwise, the NIC 240 may translate the buffer address from the physical NIC driver 234 to a physical address via, for example, the services of the I/O MMU or the address translation table 230b. The data transfer by the NIC 240 may be achieved via, for example, a programmed I/O or DMA transfer.

The software switch 232 may copy the data in the receive buffer 238 to the TGOS buffer 236, which may be, for example, a corresponding TGOS buffer for the GOS 210. The data in the TGOS buffer 236 may be copied to the GOS buffer 222 by the hypervisor 245. The hypervisor 245 may invoke a context switch to the GOS 210. The socket layer 214 may then copy the data from the GOS buffer 222 to the user buffer 220 where the application layer 212 may have access to the data. For example, if the application layer 212 comprises an email program, the data in the user buffer 222 may be an email received from the network. Accordingly, the NIC 240 may be shared by a plurality of GOSs, and the network protocol operations, such as, for example, TCP/IP operations may be offloaded to the shared NIC 240.

Although an example of a TCP/IP layers was used for the protocol stack, the invention need not be so limited. For example, various embodiments of the invention may also be used for networks that use other protocol stacks, such as, for example, the Open System Interconnection (OSI) seven-layer network model. Embodiments of the invention may comprise virtualization with a plurality of GOSs and a plurality of network layers implanted in hardware. For example, the hardware implementation of the OSI layers 5, 4, 3, and/or 2 may be in the network interface card/circuitry.

Figure 2B:
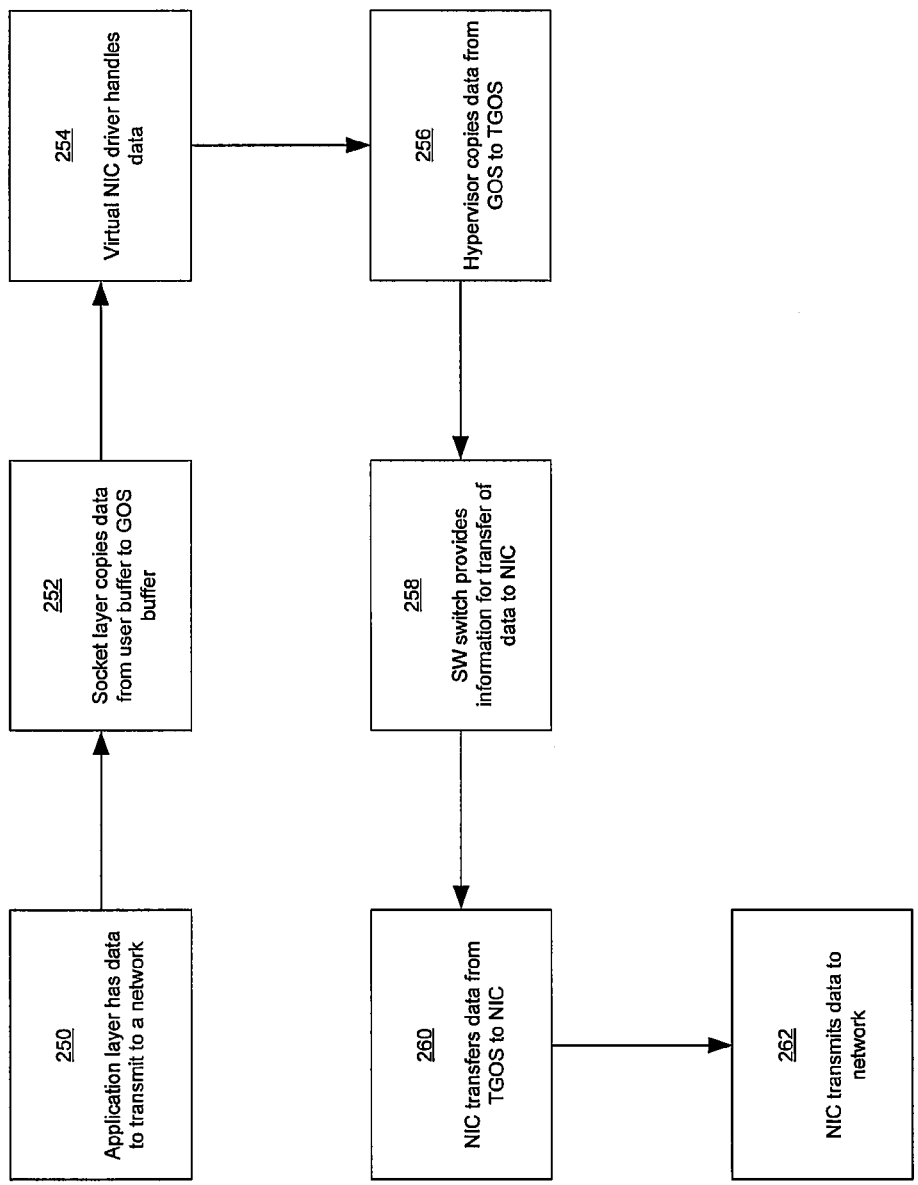
FIG. 2B is a flow diagram illustrating exemplary steps for transmitting data to a network using protocol offload functionality with I/O sharing, in accordance with an embodiment of the invention.

FIG. 2B is a flow diagram illustrating exemplary steps for transmitting data to a network using protocol offload functionality with I/O sharing, in accordance with an embodiment of the invention. Referring to FIG. 2B, there is shown steps 250 to 262. In step 250, an application layer, for example, the application layer 212 in the GOS 210, may have data to transmit to a network. The data may have been placed in the user buffer 220 by the application layer 212. For example, if the application layer 212 comprises an email program, the data in the user buffer 220 may be an email that may be sent via the network, such as, for example, the Internet.

In step 252, the data may be copied from the user buffer 220 to the GOS buffer 222 by the socket layer 214. The socket layer 214 may also indicate to the hypervisor 245 of data in the GOS buffer 222 that may be transmitted to the network. In step 254, the virtual NIC driver 216 may provide an interface for transferring the data in the GOS buffer 222 to the hypervisor 245. In step 256, the hypervisor 245 may copy the data to the TGOS buffer 236. The hypervisor 245 may also invoke a context switch to the TGOS 230.

In step 258, the data in the TGOS buffer 236 may be communicated to the NIC 240 via the software switch 232 and the physical NIC driver 234. The software switch 236 may indicate the address of the TGOS buffer 236 to the physical NIC driver 234. In step 260, the NIC 240 may process the data for transmission via the network medium, such as, for example, an Ethernet cable. For example, the TCP/IP layer block 242 in the NIC 240 may encapsulate the received data to form a TCP packet. The TCP/IP layer block 242 may then segment the TCP data to a plurality of IP packets if the TCP packet is too large. Similarly, the link layer block 244 in the NIC 240 may segment an IP packet to a plurality of Ethernet packets if the IP packet is too large. In step 262, the NIC 240 may transmit the data on to the network medium.

Figure 2C:
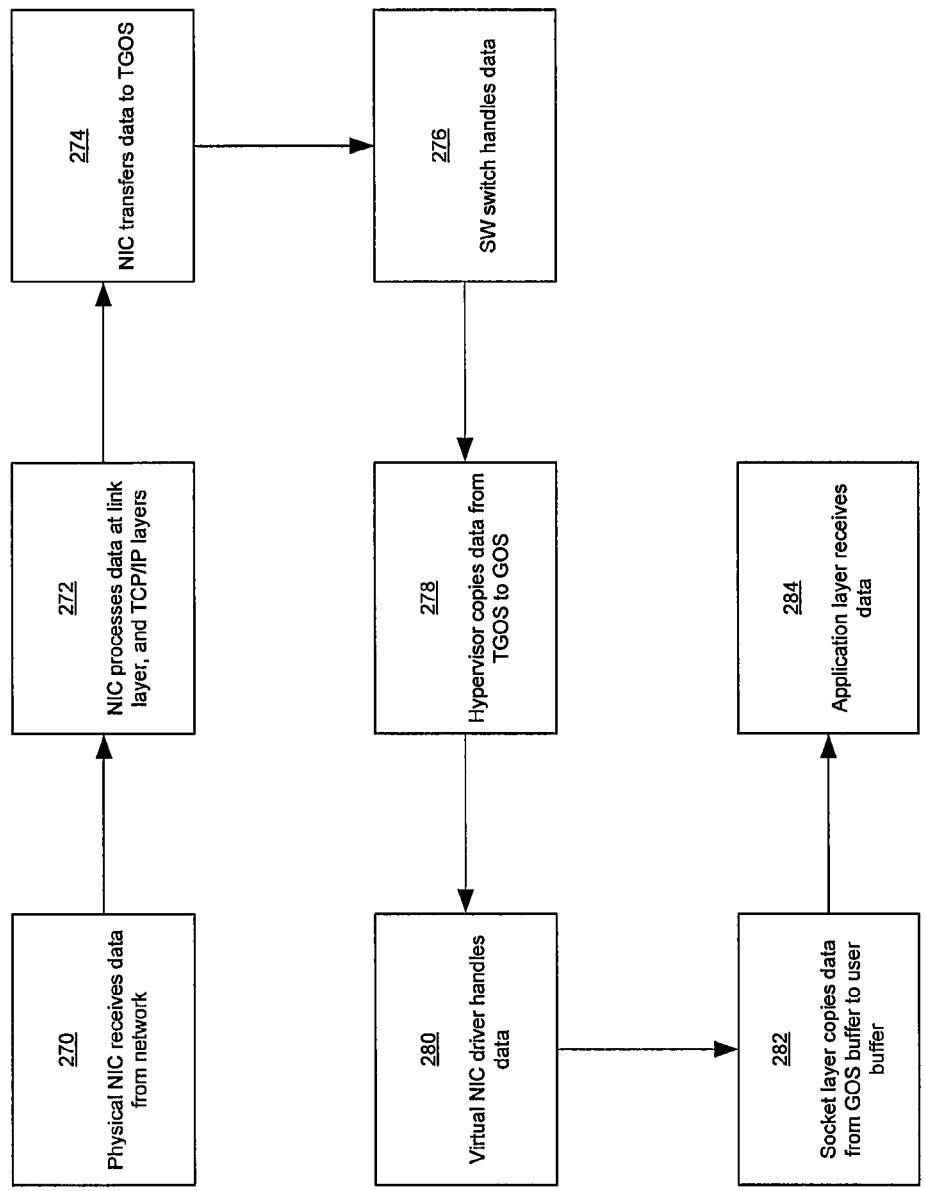
FIG. 2C is a flow diagram illustrating exemplary steps for receiving data from a network using protocol offload functionality with I/O sharing, in accordance with an embodiment of the invention.

FIG. 2C is a flow diagram illustrating exemplary steps for receiving data from a network using protocol offload functionality with I/O sharing, in accordance with an embodiment of the invention. Referring to FIG. 2C, there is shown steps 270 to 284. In step 270, the NIC 240 may receive a packet from the network. In step 272, the NIC 240 may process the received packet, which may include the link layer block 244 verifying that the packet should be received by the NIC 240. The link layer block 244 may also remove, for example, the Ethernet information to form an IP packet. The link layer block 244 in the NIC 240 may also reassemble a plurality of received Ethernet packets to one IP packet in instances where the plurality of received Ethernet packets is a result of segmentation of one IP packet by the sending network node.

The resulting IP packet may be processed by the TCP/IP layer block 242. The TCP/IP layer block 242 in the NIC 240 may parse the TCP and IP information to reassemble data in a plurality of IP packets to one TCP packet in instances where the plurality of received Ethernet packets is a result of segmentation of one IP packet by the sending network node. The NIC 240 may also determine a GOS that the received data may be communicated to.

In step 274, the NIC 240 may transfer the received data to the receive buffer 238, and may indicate to the physical NIC driver 234 that data is present in the receive buffer 238. In step 276, the physical NIC driver 234 may alert the software switch 232 of data in the receive buffer 238. Accordingly, the software switch 232 may copy the data in the receive buffer 238 to the TGOS buffer 236, which may be, for example, an appropriate TGOS buffer for the GOS 210.

In step 278, the data in the TGOS buffer 236 may be copied to the hypervisor 245. The hypervisor 245 may also invoke a context switch to the GOS 210 that is a destination for data received from the network. In step 280, the virtual NIC driver 216 may copy the data from the hypervisor 245 the data in the GOS buffer 222. In step 282, the socket layer 214 may copy the data from the GOS buffer 222 to the user buffer 220. In step 284, the application layer 212 may have access to the data in the user buffer 220.

Figure 3A:
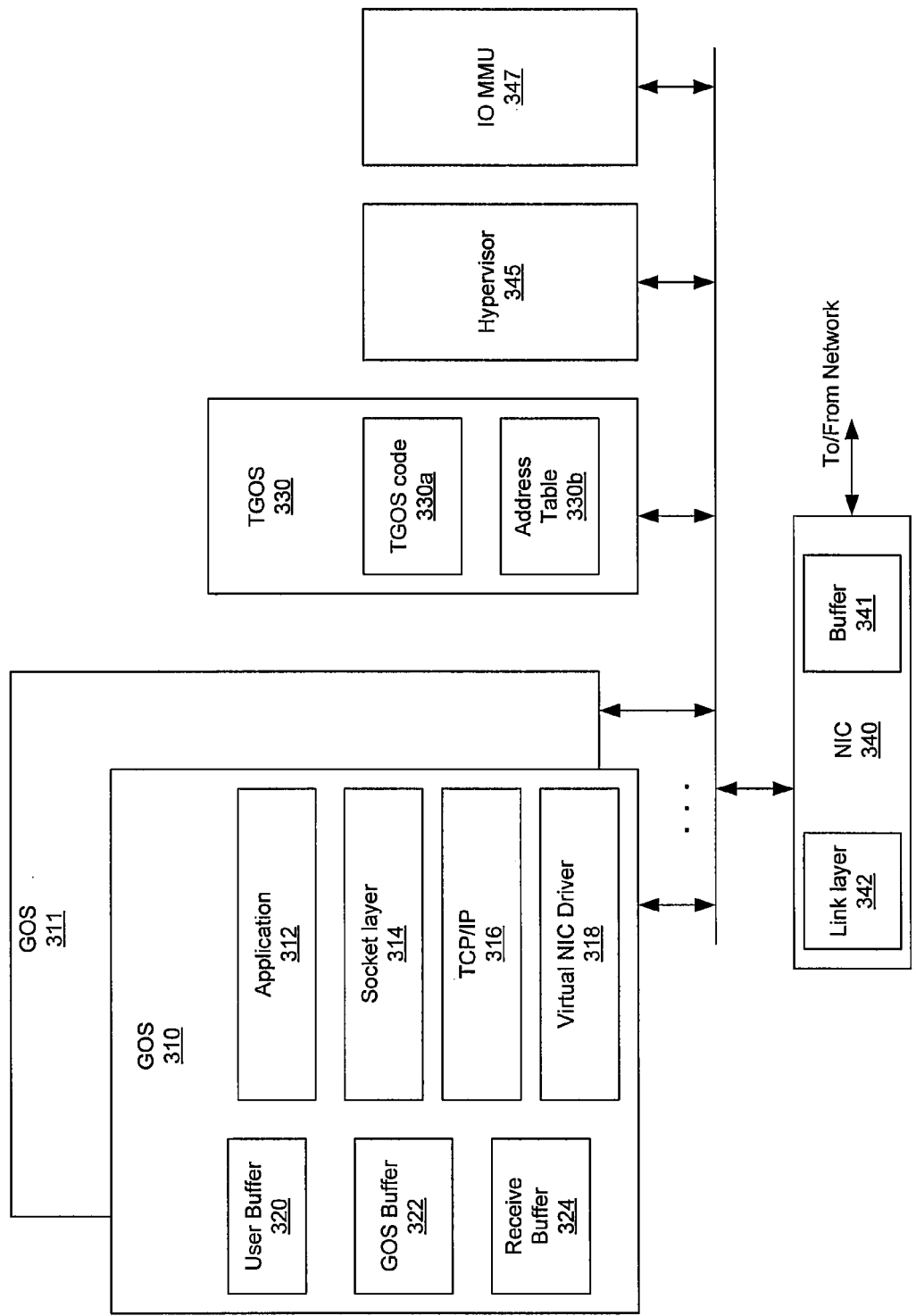
FIG. 3A is a block diagram illustrating exemplary direct I/O functionality with I/O sharing, in accordance with an embodiment of the invention.

FIG. 3A is a block diagram illustrating exemplary direct I/O functionality with I/O sharing, in accordance with an embodiment of the invention. Referring to FIG. 3A, there is shown GOSs 310 . . . 311, a TGOS 330, a NIC 340, a hypervisor 345, and an I/O memory management unit (I/O MMU) 347. Each of the GOSs 310 . . . 311 may comprise an application layer 312, a socket layer 314, a TCP/IP layer 316, and a virtual NIC driver 318. A user buffer 320, a GOS buffer 322, and a receive buffer 324 may be allocated by, for example, each of the GOSs 310 . . . 311, the TGOS 330, and/or the hypervisor 345 for use by the GOSs 310. Accordingly, each of the GOSs 310 311 may logically and/or physically comprise a user buffer 320, a GOS buffer 322, and a receive buffer 324. The GOSs 310 . . . 311 may be similar to the GOS 102a, 102b, or 102c, described with respect to FIG. 1A. The plurality of GOSs 310 311 may share a common resource, for example, the NIC 340.

The application layer 312 may comprise suitable application programs, for example, an email application program or a web-browsing program. The socket layer 314 may comprise suitable code that may enable copying of data in the user buffer 320 to a GOS buffer 322, and vice versa. The TCP/IP layer 316 may comprise suitable code that may enable TCP layer processing and/or IP layer processing for data that may be transmitted on to a network, or for data that may be received from the network. The virtual NIC driver 318 may comprise suitable code that may enable transfer of data between the NIC 340 and the each of the GOSs 310 . . . 311. The user buffer 320, the GOS buffer 322, and the receive buffer 324 may be a part of the host memory 120, for example. Alternatively, the receive buffer 324 may be, for example, a hardware buffer.

The TGOS 330 may comprise suitable logic, circuitry, and/or code that may enable support of a plurality of GOSs that transmit and/or receive data from the network. The TGOS 330 may comprise TGOS code 330a that may, for example, enable allocation of buffers for use by the GOSs. The buffers may be, for example, the user buffer 320, the GOS buffer 322, and/or the receive buffer 324. The TGOS 330 may also comprise an address table 330b that may enable translation of an offset index or a virtual address for a buffer to a physical address for the buffer. U.S. patent application Ser. No. 11/623,018 filed Jan. 12, 2007 illustrates an exemplary address translation table. The address translation table 330b may comprise addresses for a pool of buffers, where the buffers may be part of the host memory 120, for example.

The NIC 340 may comprise suitable logic, circuitry, and/or code that may process data from an application layer for transmission to the network, or receive data from the network to an application layer. The NIC 340 may also comprise a NIC buffer 341 and a link layer block 342. The NIC buffer 341 may be used to store data that may be received from the network and/or data that may be transmitted to the network. The NIC buffer 341 may be, for example, similar to the TX queues 108b, 112b, and 114b, and the RX queues 108c, 112c, and 114c. The link layer block 342 may comprise suitable logic, circuitry, and/or code that may be utilized, for example, to process data for Ethernet link layer protocol before being transmitted to an Ethernet network. Data received from the Ethernet network may also be processed by the link layer block 342.

The hypervisor 345 may comprise suitable logic, circuitry, and/or code that may enable coordinating control of data being received from or transmitted to the network, and for allocation of resources. Resources allocated may comprise, for example, various buffers for the GOSs 310 . . . 311 and the NIC 340. For example, the buffers may be allocated at power up from the host memory 120 and/or dynamically from the host memory 120 while the GOSs 310...311, the TGOS 330, and/or the NIC 340 may be operating.

The I/O MMU 347 may comprise suitable logic, circuitry, and/or code that may enable translation of virtual address to a physical address. Accordingly, a device, for example, the NIC 340 may address a memory location with a virtual memory address. The virtual memory address may be intercepted by the I/O MMU 347, and the I/O MMU 347 may translate the virtual memory address to a physical memory address. The I/O MMU 347 may output the physical memory address to, for example, an address bus coupled to the host physical memory. The NIC 340 may then access data at the location of the physical memory address. The NIC 340 may also request that the I/O MMU 347 send the translated physical address to the NIC 340. The NIC 340 may then directly access the physical address location using the physical address from the I/O MMU 347.

In operation, an application layer, for example, the application layer 312 in the GOS 310, may have data to be transmitted to the network. The data to be transmitted may be stored in the user buffer 320. The data may be copied from the user buffer 320 to the GOS buffer 322 by, for example, the socket layer 314. The socket layer 314 may request a buffer for use as a GOS buffer 322 from the TGOS 330 if there is not a GOS buffer 322 available. The allocation of buffers by the TGOS is described in U.S. patent application Ser. No. 11/623,018 filed Jan. 12, 2007.

The socket layer 314 may call the TCP/IP protocol layer 316 to process the data in the GOS buffer 322. The data in the GOS buffer 322 may be processed by the TCP/IP layer 316 according to TCP/IP protocols. For example, the data copied from the user buffer 320 may be processed by the TCP/IP layer 316 to form a TCP packet. The TCP packet may then be processed by the TCP/IP layer 316 to form an IP packet.

The socket layer 314 or other OS entity in the GOS may communicate a value corresponding to the GOS buffer 322 to the virtual NIC driver 318. The value may be interpreted to be an offset index of a buffer, a virtual address of the buffer, or a physical address of the buffer. The specific buffer addressing implementation may be design dependent. The socket layer 314 may indicate to the hypervisor 345 that data may be stored in the GOS buffer 322, where the stored data may be transmitted to the network. For example, the hypervisor 345 may allocate resources, such as the NIC 340 to the GOS 310 to allow transmission of data in the GOS buffer 322. The data in the GOS buffer 322 may then be communicated to the NIC 340 via the virtual NIC driver 318.

The virtual NIC driver 318 may provide an indication of an address of the GOS buffer 322 to the NIC 340. Accordingly, the NIC 340 may copy the data in the GOS buffer 322 to, for example, the NIC buffer 341. Access to the GOS buffer 322 by the NIC 340 is described in U.S. patent application Ser. No. 11/623,018 filed Jan. 12, 2007. The NIC 340 may copy the data from the NIC buffer 341 via, for example, a programmed I/O or DMA transfer. The data stored in the NIC buffer 341 may be encapsulated with, for example, appropriate Ethernet link layer information by the link layer block 342. The resulting packet output by the link layer block 342 may then be transmitted to, for example, an Ethernet network by the NIC 340.

Additionally, the NIC 340 may receive a packet from, for example, the Ethernet network. The received packet may be stored, for example, in the NIC buffer 341. The link layer block 342 may parse the link layer information from the received packet. If the link layer block 342 determines that the Ethernet packet reached the correct NIC, the Ethernet packet may be processed to yield an IP packet. An IP packet may also be reassembled from a plurality of Ethernet packets.

When the link layer 342 is finished processing the Ethernet packet, the NIC 340 may copy the IP packet in the NIC buffer 341 to the receive buffer 324. The IP packet may be copied to the receive buffer 428 by, for example, programmed I/O or DMA transfer. Event status may also be placed in the appropriate event queue 108a, 112a, or 114a in order that the appropriate GOS may receive the IP packet. The NIC 340 may provide an indication to the virtual NIC driver 318 that data may be stored in the receive buffer 324. The virtual NIC driver 318 may alert the socket layer 314 that the receive buffer 324 may contain data. The socket layer 314 may copy the data stored in the receive buffer 324 to the GOS buffer 322.

The socket layer 314 may then call the TCP/IP layer 316. The TCP/IP layer 316 may parse the IP and/or the TCP information from the data, which may be an IP packet, stored in the GOS buffer 322 to generate a TCP packet. For example, the TCP/IP layer 316 may remove the IP information from the IP packet stored in the GOS buffer 322 leaving a TCP packet. The TCP packet may then be processed further by the TCP/IP layer 316. Data may be extracted from the TCP packet, and this data may be copied to the user buffer 320 by the socket layer 314. Accordingly, a plurality of GOSs may share the NIC 340, and each GOS may communicate data directly with the NIC 340.

Figure 3B:
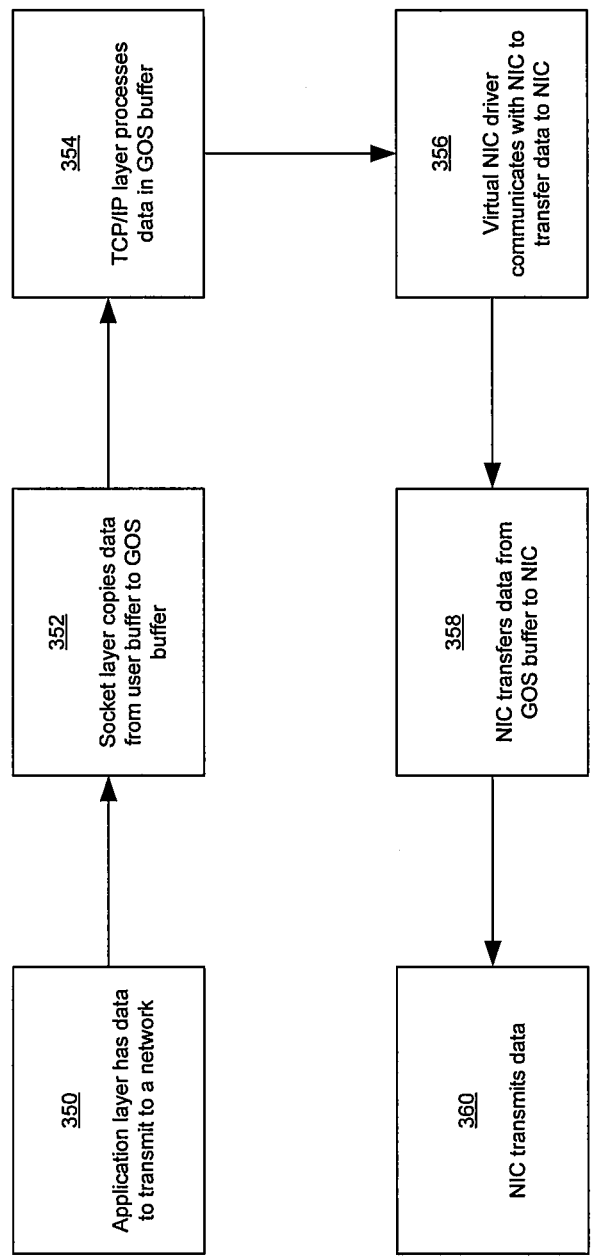
FIG. 3B is a flow diagram illustrating exemplary steps for transmitting data to a network using direct I/O with I/O sharing, in accordance with an embodiment of the invention.

FIG. 3B is a flow diagram illustrating exemplary steps for transmitting data to the network using direct I/O with I/O sharing, in accordance with an embodiment of the invention. Referring to FIG. 3B, there is shown steps 350 to 360. In step 350, an application layer, for example, the application layer 312 in the GOS 310, may have data to transmit to the network. The data may have been placed in the user buffer 320 by the application layer 312.

In step 352, the data may be copied from the user buffer 320 to the GOS buffer 322 by the socket layer 314. The socket layer 314 may have requested, for example, the GOS buffer 322 from the TGOS 330. The socket layer 314 may also provide an indication to the hypervisor 345 of presence of data in the GOS buffer 322 to be transmitted. The socket layer 314 may also provide the address of the GOS buffer 322 to the virtual NIC driver 318. The hypervisor 345 may allocate resources, such as, for example, the NIC 340, for use by the GOS 310. The socket layer 314 may also call the TCP/IP layer to process the data in the GOS buffer 322.

In step 354, the TCP/IP layer 316 may process the data in the GOS buffer 322 to generate a TCP packet, for example, by appending a TCP header to the data in the GOS buffer 322. The TCP/IP layer 316 may process the resulting TCP packet to generate one or more IP packets. The TCP/IP layer 316 may segment the TCP packet to generate a plurality of IP packets in step 354 if the TCP packet is too large. The TCP/IP layer 316 may append an IP header to the TCP packet, or to each segment of the segmented TCP packet, to form one or more IP packets.

In step 356, the virtual NIC driver 318 may provide an interface for allowing the NIC 340 to access the IP packets in the GOS buffer 322. The virtual NIC driver 318 may post the address of the GOS buffer 322 to the NIC 340. The NIC 340 may copy the IP packets in the GOS buffer 322 to the NIC buffer 341. In step 358, the NIC 340 may process the IP packets in the NIC buffer 341 for transmission via the network medium, such as, for example, an Ethernet cable. This may comprise, for example, processing the data for Ethernet protocol. For example, the link layer block 342 in the NIC 340 may segment an IP packet to a plurality of Ethernet packets if the IP packet is too large. In step 360, the NIC 340 may transmit the Ethernet packets on to a network medium, which may be, for example, cables that transport the Ethernet packets from one network node to another.

Figure 3C:
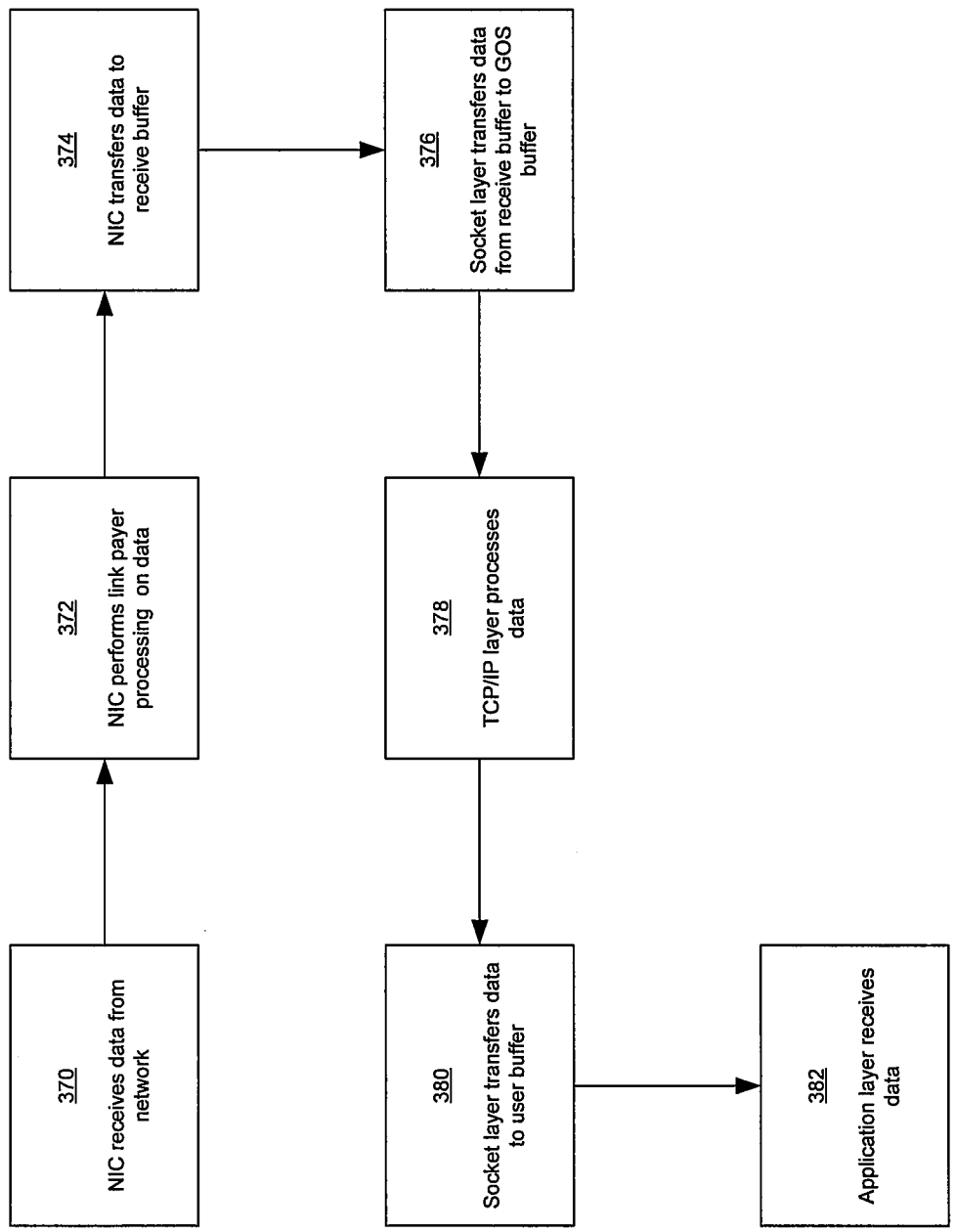
FIG. 3C is a flow diagram illustrating exemplary steps for receiving data from a network using direct I/O with I/O sharing, in accordance with an embodiment of the invention.

FIG. 3C is a flow diagram illustrating exemplary steps for receiving data from a network using direct I/O with I/O sharing, in accordance with an embodiment of the invention. Referring to FIG. 3C, there is shown steps 370 to 382. In step 370, the NIC 340 may receive an Ethernet packet from the network. The received n Ethernet packet may be stored in, for example, the NIC buffer 341. In step 372, the link layer block 342 in the NIC 340 may process the received Ethernet packet, which may include verifying that the Ethernet packet should be received by the NIC 340. The link layer block 342 may also remove, for example, Ethernet information from the received Ethernet packet to form an IP packet. The NIC 340 may also determine which GOS should receive the IP packet. The link layer block 342 in the NIC 340 may reassemble a plurality of received Ethernet packets to one IP packet if the sending network node segmented an IP packet to a plurality of Ethernet packets during transmission.

In step 374, the NIC 340 may transfer the IP packet in the NIC buffer 341 to the receive buffer 324. When the NIC 340 finishes transferring the IP packet, it may indicate to the virtual NIC driver 318 that it has finished the IP packet transfer. The virtual NIC driver 318 may indicate to the socket layer 314 that the receive buffer 324 has a new IP packet. In step 376, the socket layer 314 may copy the IP packet to the GOS buffer 322. In step 378, the TCP/IP layer 316 may process IP packet in the GOS buffer 322 to remove the TCP and/or IP information to retrieve data for use by the application layer 312.

In step 380, the socket layer 314 may copy the data from the GOS buffer 322 to the user buffer 320. In step 382, the application layer 212 may have access to the data in the user buffer 220.

Figure 4A:
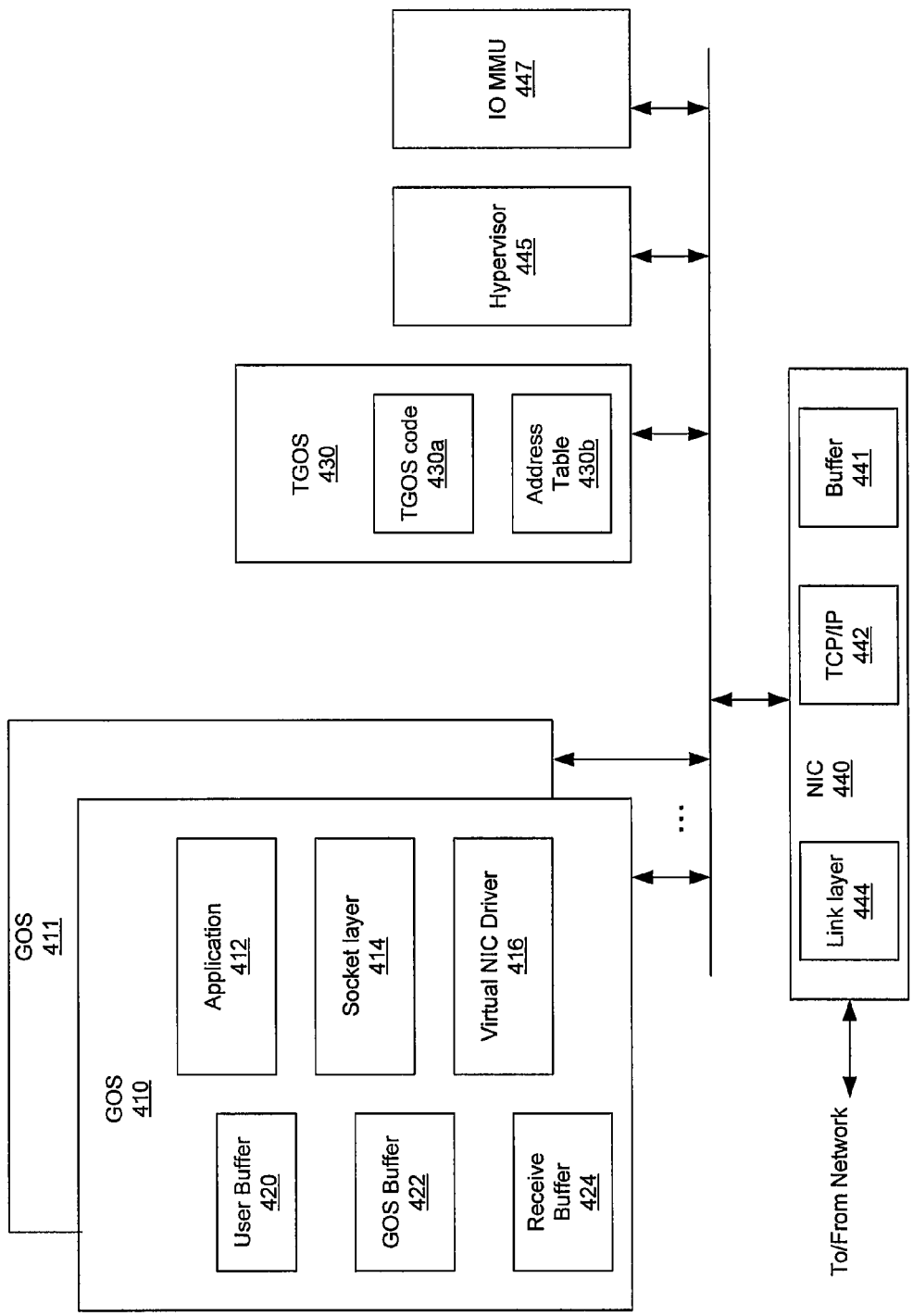
FIG. 4A is a block diagram illustrating exemplary protocol offload functionality and direct I/O functionality with I/O sharing, in accordance with an embodiment of the invention.

FIG. 4A is a block diagram illustrating exemplary protocol offload functionality and direct I/O functionality with I/O sharing, in accordance with an embodiment of the invention. Referring to FIG. 4A, there is shown a GOSs 410 . . . 411, a TGOS 430, a NIC 440, a hypervisor 445, and an I/O memory management unit (I/O MMU) 447. Each of the GOSs 410 . . . 411 may comprise an application layer 412, a socket layer 414, and a virtual NIC driver 416. A user buffer 420, a GOS buffer 422, and a receive buffer 424 may be allocated, for example, by each of the GOS 410 . . . 411, the TGOS 420, and/or the hypervisor 445, for use by the GOS 410. Accordingly, each of the GOSs 410 . . . 411 may logically and/or physically comprise the user buffer 420, the GOS buffer 422, and the receive buffer 424. The GOSs 410 . . . 411 may be similar to the GOS 102a, 102b, or 102c, described with respect to FIG. 1A. The plurality of GOSs 410 . . . 411 may share a common resource, for example, the NIC 440.

The application layer 412 may comprise suitable applications that a user may use, such as, for example, an email application program or a web-browsing program. The socket layer 414 may comprise suitable code that may enable copying of data in a user buffer from the application layer 412 to a GOS buffer 422, and vice versa. The virtual NIC driver 416 may comprise suitable code that may enable transfer of data between the NIC 440 and each of the GOSs 410 . . . 411. The user buffer 420, the GOS buffer 422, and the receive buffer 424 may be a part of the host memory 120, for example. Alternatively, the receive buffer 424 may be, for example, a hardware buffer.

The TGOS 430 may comprise suitable logic, circuitry, and/or code that may enable support of a plurality of GOSs that transmit and/or receive data from the network. The TGOS 430 may comprise TGOS code 430a that may, for example, enable allocation of NIC resources and/or services and/or buffers for use by the GOSs. The allocated buffers may be, for example, the user buffer 420, the GOS buffer 422, and/or the receive buffer 424. The TGOS 430 may also comprise an address table 430b that may enable translation of an offset index or a virtual address for a buffer to a physical address for the buffer. U.S. patent application Ser. No. 11/623,018 filed Jan. 12, 2007 illustrates an exemplary address table. The address table 430b may comprise addresses for a pool of buffers, where the buffers may be part of the host memory 120, for example.

The NIC 440 may comprise suitable logic, circuitry, and/or code that may process data from an application layer for transmission to the network, or receive data from the network. The NIC 440 may also comprise a NIC buffer 441, a TCP/IP layer block 442, and a link layer block 444. The NIC buffer 441 may be used to store data that may be received from the network and/or data that may be transmitted to the network. The NIC buffer 441 may be similar, for example, to the TX queues 108b, 112b, and 114b, and the RX queues 108c, 112c, and 114c.

The TCP/IP layer block 442 may comprise suitable logic, circuitry, and/or code that may be utilized to process data transmitted and/or received from the network with respect to TCP/IP protocols. The link layer block 442 may comprise suitable logic, circuitry, and/or code that may be utilized, for example, to process data for Ethernet link layer protocol before being transmitted to an Ethernet network. Data received from the Ethernet network may also be processed by the link layer block 442.

The hypervisor 445 may comprise suitable logic, circuitry, and/or code that may enable coordinating control of data being received from or transmitted to the network, and for allocation of resources. Resources allocated may comprise, for example, various buffers for the GOSs 410 . . . 411 and the NIC 440. For example, the buffers may be allocated at power up from the host memory 120 and/or dynamically from the host memory 120 while the GOSs 410 . . . 411, the TGOS 430, and/or the NIC 440 may be operating. The hypervisor 445 may receive requests for buffers from the socket layer 414 and may route the received requests to the TGOS 430. The TGOS 430 may then allocate a buffer. The address of the allocated buffer may be sent to the hypervisor 445. The hypervisor 445 may then communicate the address of the allocated buffer to the socket layer 414. Alternatively, an offset index for the buffer may be communicated to the hypervisor 445, which may then communicate the offset index to the socket layer 414.

The I/O MMU 447 may comprise suitable logic, circuitry, and/or code that may enable translation of virtual address to a physical address. Accordingly, a device, for example, the NIC 440 may address a memory location with a virtual memory address. The virtual memory address may be intercepted by the I/O MMU 447, and the I/O MMU 447 may translate the virtual memory address to a physical memory address. The I/O MMU 447 may output the physical memory address to, for example, an address bus. The NIC 440 may then access data at the location of the physical memory address.

In operation, an application layer, for example, the application layer 412 in the GOS 410, may have data to be transmitted to the network. The data may be copied from the user buffer 420 to the GOS buffer 422 by, for example, the socket layer 414. The socket layer 414 may request a buffer for use as the GOS buffer 422 from the TGOS 430 if there is not a GOS buffer 422 available. Exemplary allocation of buffers by the TGOS is described in U.S. patent application Ser. No. 11/623,018 filed Jan. 12, 2007.

The socket layer 414 may indicate to the virtual NIC driver 416 an offset index for the GOS buffer 422, a virtual address for the GOS buffer 422, or a physical address for the GOS buffer 422. The specific addressing implementation may be design dependent. The socket layer 414 may also indicate to the hypervisor 445 of data in the GOS buffer 422 that may be transmitted to the network. The hypervisor 445 may allocate resources, such as, for example, in the NIC 440, to the GOS 410 to allow transmission of the data in the GOS buffer 422.

The virtual NIC driver 416 may indicate an address of the GOS buffer 422 to the NIC 440. If the address is a physical address, the NIC 440 may copy the data from the GOS buffer 422 to, for example, the NIC buffer 441. Otherwise, the NIC 440 may translate the address to a physical address. The translation may be accomplished via the address translation table 430b, or via the I/O MMU 447. U.S. patent application Ser. No. 11/623,018 filed Jan. 12, 2007 describes access of the GOS buffer 422 by the NIC 440. Copying of the data to the NIC 440 may be achieved via, for example, a programmed I/O or DMA transfer.

The TCP/IP layer block 442 in the NIC 440 may generate one or more IP packets from the data in the NIC buffer 441. The encapsulated data from the TCP/IP layer block 442 may then be encapsulated with appropriate link layer information by the link layer block 444. The packet from the link layer block 444, which may be an Ethernet packet, may be transmitted on to the network, for example, an Ethernet network, by the NIC 440.

Additionally, the NIC 440 may receive a packet from, for example, the Ethernet network. The received Ethernet packet may be stored, for example, in the NIC buffer 441. The link layer block 444 may parse the link layer information from the received Ethernet packet. If the link layer block 444 determines that the Ethernet packet reached the correct NIC, the Ethernet packet may be processed to yield an IP packet. Alternatively, an IP packet may be reassembled from a plurality of Ethernet packets. The resulting IP packet may be communicated to the TCP/IP layer block 442.

The TCP/IP layer block 442 may determine if an IP datagram is one of a plurality of IP datagrams generated from one TCP segment by a sending network node. If so, the TCP/IP layer block 442 may reassemble a plurality of IP packets to form one TCP packet. Otherwise, the TCP/IP layer block 442 may generate a TCP packet from one IP packet. The resulting TCP packet may be processed by the TCP/IP layer block 442 to form a data packet, which may be stored in the NIC buffer 441. The processing may comprise removing a TCP header from the TCP segment. The NIC 440 may also determine a GOS to which the data packet may be communicated. The GOS determined by the NIC 440 may be notified of the data packet by the NIC 440 placing an event in, for example, the event queue 108a, 112a, or 114a.

The virtual NIC driver 416 may communicate with the NIC 440 to control the transfer of the data packet in, for example, the NIC buffer 441 to the receive buffer 424. For example, the virtual NIC driver 416 may communicate an address of the receive buffer 424 to the NIC 440. If the address for the receive buffer 424 is a physical address, the NIC 440 may use the physical address to transfer data packet from the NIC buffer 441 to the receive buffer 424. Otherwise, the NIC 440 may translate the buffer address from the virtual NIC driver 416 to a physical address via the address translation table 430b or the I/O MMU 447. The data transfer by the NIC 440 may be achieved via, for example, a programmed I/O or DMA transfer.

The NIC 440 may indicate to the virtual NIC driver 416 that the data packet transferred from the NIC buffer 441 may be in the receive buffer 424. The virtual NIC driver 416 may alert the socket layer 414 that the receive buffer 424 may contain the data packet from the NIC buffer 441. The socket layer 414 may copy the data packet in the receive buffer 424 to the GOS buffer 422. The data packet in the GOS buffer 422 may be copied to the user buffer 420 by the socket layer 414. The application layer 412 may then access data in the data packet in the user buffer 420. Accordingly, a plurality of GOSs may share a single NIC that may offload network protocol operation. The network protocol operation may be, for example, TCP/IP operations. Each GOS may also communicate data directly to the NIC for processing and transmission to a network, and may be directly communicated by the NIC data received from the network and processed by the NIC.

Although an example of a TCP/IP layers was used for the protocol stack, the invention need not be so limited. For example, some embodiments of the invention may also be used for networks that use other protocol stacks, such as, for example, the Open System Interconnection (OSI) seven-layer network model. Other embodiments of the invention may comprise virtualization with a plurality of GOSs and a plurality of network layers implanted in hardware. For example, the hardware implementation of the OSI layers 5, 4, 3, and/or 2 may be in the network interface card/circuitry.

Figure 4B:
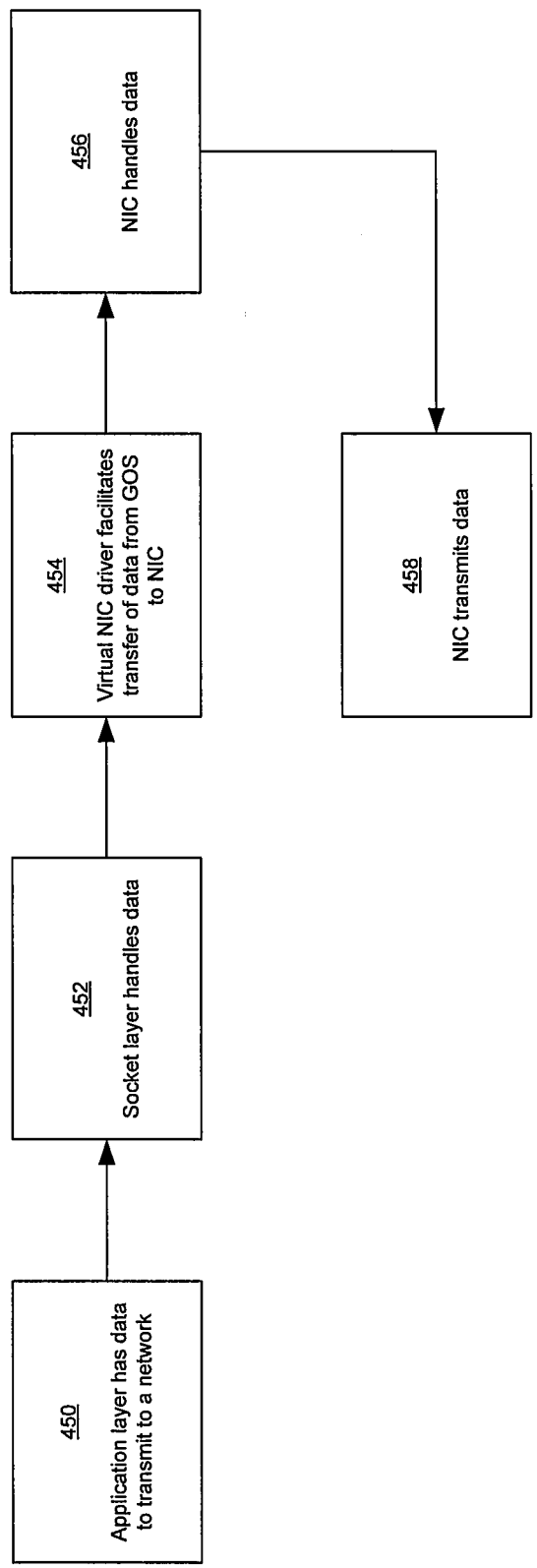
FIG. 4B is a flow diagram illustrating exemplary steps for transmitting data to a network using protocol offload functionality and direct I/O with I/O sharing, in accordance with an embodiment of the invention.

FIG. 4B is a flow diagram illustrating exemplary steps for transmitting data to the network using protocol offload functionality and direct I/O with I/0 sharing, in accordance with an embodiment of the invention. Referring to FIG. 4B, there is shown steps 450 to 458. In step 450, an application layer, for example, the application layer 412 in the GOS 410, may have data to be transmitted to the network. The data to be transmitted may have been placed in the user buffer 420 by the application layer 412.

In step 452, the data may be copied from the user buffer 420 to the GOS buffer 422 by the socket layer 414. The socket layer 414 may further communicate to the virtual NIC driver 416 the address of the GOS buffer 422.

In step 454, the virtual NIC driver 416 may communicate an address of the GOS buffer 422 to the NIC 440. If the address is a physical address of the GOS buffer 422, the NIC 440 may use the physical address to transfer data from the GOS buffer 422 to, for example, the NIC buffer 441. If the address of the GOS buffer 422 is not a physical address, the NIC 440 may use the address translation table 430b to determine the physical address. The NIC 440 may then transfer data from the GOS buffer 422 to, for example, the NIC buffer 441. The data transfer by the NIC 440 may occur via, for example, a programmed I/O or DMA transfer.

In step 456, the NIC 440 may process the data in the NIC buffer 441 for transmission via a network medium, such as, for example, a cable. The processing may comprise TCP/IP layer processing by the TCP/IP layer block 442. The TCP/IP layer block 442 in the NIC 440 may, for example, process the data in the NIC buffer 441 to form a TCP segment. The TCP/IP layer block 442 may further process the TCP segment, including segmenting the TCP segment to a plurality of datagrams if the TCP packet is larger than the allowed size for a data field of an IP datagram. The plurality of packets may then be processed to form a plurality of IP packets.

The processing may also comprise link layer processing by the link layer block 444. The link layer block 442 may process each IP packet for transmission, for example, via an Ethernet medium. For example, the link layer block 444 in the NIC 440 may segment an IP packet to a plurality of Ethernet packets if the IP packet is larger than the allowed size for a data field of an Ethernet packet. In step 458, the NIC 440 may transmit the Ethernet packet on to the network medium, which may be, for example, an Ethernet cable.

Figure 4C:
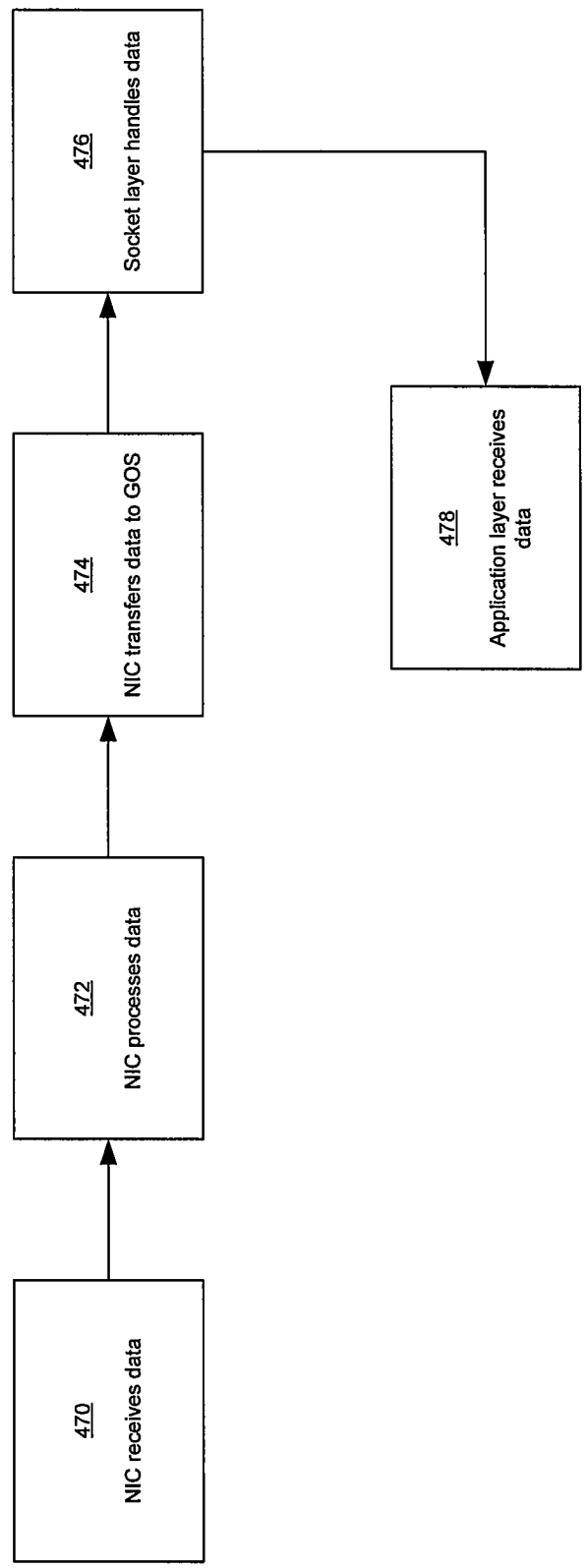
FIG. 4C is a flow diagram illustrating exemplary steps for receiving data from a network using protocol offload functionality and direct I/O with I/O sharing, in accordance with an embodiment of the invention.

FIG. 4C is a flow diagram illustrating exemplary steps for receiving data from a network using protocol offload functionality and direct I/O with I/O sharing, in accordance with an embodiment of the invention. Referring to FIG. 4C, there is shown steps 470 to 478. In step 470, the NIC 440 may receive an Ethernet packet from, for example, the Internet via an Ethernet medium. The Ethernet packet may be stored in the NIC buffer 441. In step 472, the NIC 440 may process the Ethernet packet, which may include the link layer block 444 verifying that the Ethernet packet should be received by the NIC 440.

The link layer block 444 may remove, for example, the Ethernet information from the received packet to form an IP packet. The link layer block 444 in the NIC 440 may also reassemble a plurality of Ethernet packets to form one IP datagram if the sending network node segmented an IP packet during transmission. The resulting IP packet may then be processed by the TCP/IP layer block 442. The TCP/IP layer block 442 in the NIC 440 may reassemble a plurality of IP packets to form one TCP packet if the sending network note segmented a TCP packet to form a plurality of IP packets during transmission. TCP/IP layer block 442 in the NIC 440 may then form a data packet from the TCP packet, and the data packet may be stored in the NIC buffer 441. The NIC 440 may also determine a GOS to which the data packet may be communicated. Event status may also be placed in the appropriate event queue, for example, the event queue 108a, 112a, or 114a in order to provide an indication to the appropriate GOS that it may receive a data packet.

In step 474, the NIC 440 may transfer the data packet in the NIC buffer 441 to the receive buffer 424 in the GOS 410. The virtual NIC driver 416 may have communicated to the NIC 440 an address of the receive buffer 424. The virtual NIC driver 416 may have received the receive buffer 424 address from the socket layer 414. If the address for the receive buffer 424 is a physical address, the NIC 440 may use the physical address to transfer data from the NIC buffer 441 to the receive buffer 424. Otherwise, the NIC 440 may translate the buffer address from the virtual NIC driver 416 to a physical address via the address translation table 430b. The data transfer by the NIC 440 may be achieved via, for example, a programmed I/O or DMA transfer.

The NIC 440 may provide an indication, for example, by posting an event, to the virtual NIC driver 416 that data may be in the receive buffer 424. The virtual NIC driver 416 may alert the socket layer 414 of the presence of a data packet in the receive buffer 424. In step 476, the socket layer 414 may copy the data packet from the receive buffer 424 to the user buffer 420. In step 478, the application layer 412 may have access to the data in the data packet in the user buffer 420.

In accordance with an embodiment of the invention, aspects of an exemplary system may comprise a single NIC, for example, the NIC 440. The NIC 440 may be shared by a plurality of GOSs, such as, for example, the GOSs 410 . . . 411, to access a network. For example, the GOS 410 may access a network via the NIC 440 when the NIC 440 communicates with the GOS 410.

The NIC 440 may directly handle input/output processing for network access for each of the plurality of GOSs 410 . . . 411. The NIC 440 may directly handle processing of data to be transmitted to a network and/or data received from a network for each of the plurality of GOSs 410 . . . 411 without the TGOS 430 handling the data to be transmitted to the network and/or the data received from the network. The NIC 440 may copy data directly from an application buffer, for example, the user buffer 420, for one of the plurality of GOSs to a buffer in the single NIC, for example, the NIC buffer 441. The NIC 440 may also copy data directly from the NIC buffer 441 to the user buffer 420.

Accordingly, the NIC 440 may be a resource that may be shared by the plurality of GOSs 410 . . . 411. Each of the GOSs 410 . . . 411 may communicate with the NIC 440 when a hypervisor, for example, the hypervisor 445, which may allocate resources to the GOSs 410 . . . 411, indicates that a GOS may access the network. The hypervisor 445 may operate in conjunction with the TGOS 430. Alternatively, the functionality of the TGOS 430 may be embedded into the hypervisor 445. Whether the functionality is in the hypervisor 445 and the TGOS 430, or just in the hypervisor 445 may be design dependent.

The NIC 440 may offload network protocol operations from, for example, the GOSs 410 . . . 411. For example, the NIC 440 may execute OSI layer 3, OSI layer 4, and/or OSI layer 5 protocol operations. In other embodiments of the invention, the NIC 440 may execute TCP operations and/or IP operations. The NIC 440 may also enable execution of link layer network protocol operations, which may be, for example, OSI layer 2. The NIC 440 may also offload network operations from a host system, such as, for example, the host system 106, which may be communicatively coupled to the NIC 440.

The NIC 440 may enable handling of network data access for each of the plurality of GOSs 410 . . . 411 via a TGOS, such as, for example, the TGOS 430. Additionally, the NIC 440 may enable direct input/output processing for the network data access for each of a plurality of GOSs 410 . . . 411 without involving any processing by the TGOS 430. However, the TGOS 430 and/or the hypervisor 445 may be involved in resource allocation for the network data access and/or processing of commands from one of the GOSs 410 . . . 411. The user buffer 420 on the GOS 410 may be accessed via an address that may be communicated to the NIC 440 by the GOS 410. For example, the virtual NIC driver 416 may communicate an address for the GOS buffer 422 to the NIC 440. Accordingly, the NIC 440 may transfer data from the GOS buffer 422 to the NIC buffer 441.

The address of a buffer from a GOS may be a physical address or a virtual address. If the address is a physical address, the NIC 440 may be able to access the buffer on the GOS directly. If the address is a virtual address, the NIC 440 may translate the virtual address to a physical address. The NIC 440 may use, for example, the address translation table 430b in the TGOS 430. Alternatively, the NIC 440 may use the I/O MMU 447. Accordingly, the NIC 440 may output an address to the I/O MMU 447, and the I/O MMU 447 may output a physical address on an address bus, thereby allowing read/write accesses to a location addressed by the physical address. Alternatively, a GOS may communicate a buffer offset index. For example, a buffer may have an offset index of 49 indicating that it may be a $50^{th}$ buffer in a pool of buffers. An offset index may generally not be translated via the I/O MMU 447. Accordingly, an offset index may be translated using an address translation table, such as, for example, the address translation table 430b.

Although exemplary TCP/IP layers were used for the protocol stack, the invention need not be so limited. For example, some embodiments of the invention may also be used for networks that use other protocol stacks, such as, for example, the Open System Interconnection (OSI) seven-layer network model. Other embodiments of the invention may comprise virtualization with a plurality of GOSs and a plurality of network layers implanted in hardware. For example, the hardware implementation of the OSI layers 5, 4, 3, and/or 2 may be in the network interface card/circuitry.

Additionally, while various functional blocks may have been described, the invention need not be so limited. Some embodiments of the invention may use other configurations. For example, some of the functionality of the TGOS 430 and the hypervisor 445 may be combined or otherwise redistributed to one or more functional blocks. Additionally, at least some of the functionality of the socket layer 414 and the virtual NIC driver 416 may be combined or otherwise redistributed to one or more functional blocks.

Another embodiment of the invention may provide a machine-readable storage, having stored thereon, a computer program having at least one code section executable by a machine, thereby causing the machine to perform the steps as described above for protocol offload in a virtualized network environment.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for communicating via a network, the method comprising:
   sharing by a plurality of guest operating systems (GOSs), a single network interface circuitry, which provides access to a network; and
   handling processing of one or both of: data to be transmitted to a network and/or data received from a network directly by said single network interface circuitry for each of said plurality of GOSs without an intermediary for said plurality of GOSs handling processing of said one or both of: said data to be transmitted to said network and/or said data received from said network.

2. The method according to claim 1, comprising handling directly by said single network interface circuitry, input/output processing for said network access for each of said plurality of GOSs.

3. The method according to claim 1, comprising copying by said single network interface circuitry, data directly from a buffer for one of said plurality of GOSs to a buffer in said single network interface circuitry.

4. The method according to claim 3, wherein said buffer in one of said plurality of GOSs is an application buffer.

5. The method according to claim 1, wherein said single network interface circuitry copies data directly from a buffer in said single network interface circuitry to a buffer for one of said plurality of GOSs.

6. The method according to claim 1, comprising switching communication by said single network interface circuitry on behalf of said plurality of GOSs wherein each GOS accesses said network when said communication for said single network interface circuitry is switched to said network.

7. The method according to claim 1, comprising coordinating command processing of at least one of said plurality of GOSs by one or both of: a trusted guest operating system (TGOS) and/or a hypervisor.

8. The method according to claim 1, comprising accessing by said single network interface circuitry, at least one buffer for at least one of said plurality of GOSs via a physical address communicated by said at least one of said plurality of GOSs.

9. The method according to claim 1, wherein said handling by said single network interface circuitry on behalf of one or both of: a GOS and/or TGOS comprises one or more of: open systems interconnection (OSI) layer 3 protocol operations, OSI layer 4 protocol operations, and/or OSI layer 5 protocol operations.

10. The method according to claim 1, wherein said handling by said single network interface circuitry on behalf of one or both of: a GOS and/or TGOS comprises one or both of: TCP operations and/or IP operations.

11. The method according to claim 1, comprising executing on behalf of one or both of: a GOS and/or TGOS, link layer network protocol operations by said single network interface circuitry.

12. A method for communicating via a network, the method comprising:
   sharing by a plurality of guest operating systems (GOSs), a single network interface circuitry, which provides access to a network; and
   handling processing of one or both of: data to be transmitted to a network and/or data received from a network, through a trusted guest operating system (TGOS) by said single network interface circuitry for each of said plurality of GOSs handling processing of said one or both of: said data to be transmitted to said network and/or said data received from said network.

13. The method according to claim 12, wherein said handling of processing by said single network interface circuitry on behalf of one or both of: a GOS and/or TGOS comprises one or more of: open systems interconnection (OSI) layer 2 protocol operations, OSI layer 3 protocol operations, OSI layer 4 protocol operations, and/or OSI layer 5 protocol operations.

14. The method according to claim 12, comprising copying by said single network interface circuitry, data directly between a buffer for one of said plurality of GOSs to a buffer in said single network interface circuitry.

15. The method according to claim 12, comprising copying by said single network interface circuitry, data between a buffer for one of said plurality of GOSs to a buffer in said single network interface circuitry via an intermediate buffer in said TGOS.

16. A non-transitory machine-readable storage medium having stored thereon, a computer program having at least one code section for communicating via a network, the at least one code section being executable by a machine for causing the machine to perform steps comprising:
   sharing by a plurality of guest operating systems (GOSs) a single network interface circuitry, which provides access to a network; and
   handling processing of one or both of: data to be transmitted to a network and/or data received from a network directly by said single network interface circuitry for each of said plurality of GOSs without an intermediary for said plurality of GOSs handling processing of said one or both of: said data to be transmitted to said network and/or said data received from said network.

17. The non-transitory machine-readable storage medium according to claim 16, wherein said at least one code section comprises code for handling directly by said single network interface circuitry, input/output processing for said network access for each of said plurality of GOSs.

18. The non-transitory machine-readable storage medium according to claim 16, wherein said at least one code section comprises code for copying by said single network interface circuitry, data directly from a buffer for one of said plurality of GOSs to a buffer in said single network interface circuitry.

19. The non-transitory machine-readable storage medium according to claim 18, wherein said buffer in one of said plurality of GOSs is an application buffer.

20. The non-transitory machine-readable storage medium according to claim 16, wherein said at least one code section comprises code for copying by said single network interface circuitry, data directly from a buffer in said single network interface circuitry to a buffer for one of said plurality of GOSs.

21. The non-transitory machine-readable storage medium according to claim 16, wherein said at least one code section comprises code for switching communication by said single network interface circuitry on behalf of said plurality of GOSs wherein each GOS accesses said network when said communication for said single network interface circuitry is switched to said network.

22. The non-transitory machine-readable storage medium according to claim 16, wherein said at least one code section comprises code for coordinating command processing of at least one of said plurality of GOSs by one or both of: a trusted guest operating system (TGOS) and a hypervisor.

23. The non-transitory machine-readable storage medium according to claim 16, wherein said at least one code section comprises code for accessing by said single network interface circuitry, at least one buffer for at least one of said plurality of GOSs via a physical address communicated by said at least one of said plurality of GOSs.

24. The non-transitory machine-readable storage medium according to claim 16, wherein said handling by said single network interface circuitry comprises one or more of: open systems interconnection (OSI) layer 3 protocol operations, OSI layer 4 protocol operations, and/or OSI layer 5 protocol operations.

25. The non-transitory machine-readable storage medium according to claim 16, wherein said handling by said single network interface circuitry on behalf of one or both of: a GOS and TGOS comprises one or both of: TCP operations and/or IP operations.

26. The non-transitory machine-readable storage medium according to claim 16, wherein said at least one code section comprises code for executing on behalf of one or both of: a GOS and/or TGOS, link layer network protocol operations by said single network interface circuitry.

27. A non-transitory machine-readable storage having medium stored thereon, a computer program having at least one code section for communicating via a network, the at least one code section being executable by a machine for causing the machine to perform steps comprising:
   sharing by a plurality of guest operating systems (GOSs), a single network interface circuitry, which provides access to a network; and
   handling processing of one or both of: data to be transmitted to a network and/or data received from a network, through a trusted quest operating system (TGOS) by said single network interface circuitry for each of said plurality of GOSs handling processing of said one or both of: said data to be transmitted to said network and/or said data received from said network.

28. The non-transitory machine-readable storage medium according to claim 27, wherein said handling of processing by said single network interface circuitry is on behalf of one or both of: a GOS and/or TGOS comprises one or more of: open systems interconnection (OSI) layer 2 protocol operations, OSI layer 3 protocol operations, OSI layer 4 protocol operations, and/or OSI layer 5 protocol operations.

29. The non-transitory machine-readable storage medium according to claim 27, wherein said at least one code section comprises code for copying by said single network interface circuitry, data directly between a buffer for one of said plurality of GOSs to a buffer in said single network interface circuitry.

30. The non-transitory machine-readable storage medium according to claim 27, wherein said at least one code section comprises code for copying by said single network interface circuitry, data between a buffer for one of said plurality of GOSs to a buffer in said single network interface circuitry via an intermediate buffer in said TGOS.

31. A system for communicating via a network, the system comprising:
   a single network interface circuitry that is shared by a plurality of quest operating systems (GOSs), wherein said single network interface circuitry provides access to a network, and said single network interface circuitry directly handles processing of one or both of: data to be transmitted to a network and/or data received from a network, for each of said plurality of GOSs without an intermediary for said plurality of GOSs handling processing of said one or both of: said data to be transmitted to said network and/or said data received from said network.

32. The system according to claim 31, wherein said single network interface circuitry is operable to handles directly, input/output processing for said network access for each of said plurality of GOSs.

33. The system according to claim 31, wherein said single network interface circuitry is operable to copy data directly from a buffer for one of said plurality of GOSs to a buffer in said single network interface circuitry.

34. The system according to claim 33, wherein said buffer in one of said plurality of GOSs is an application buffer.

35. The system according to claim 31, wherein said single network interface circuitry is operable to copy data directly from a buffer in said single network interface circuitry to a buffer for one of said plurality of GOSs.

36. The system according to claim 31, wherein communication is switched by said single network interface circuitry on behalf of said plurality of GOSs to allow each GOS to access said network when said communication for said single network interface circuitry is switched to said network.

37. The system according to claim 31, wherein one or both of: a hypervisor and/or a trusted guest operating system (TGOS) coordinates command processing of said at least one of said plurality of GOSs.

38. The system according to claim 31, wherein said single network interface circuitry is operable to access at least one buffer for at least one of said plurality of GOSs via a physical address communicated by said at least one of said plurality of GOSs.

39. The system according to claim 31, wherein said handling by said single network interface circuitry on behalf of one or both of: a GOS and/or TGOS comprises one or more of: open systems interconnection (OSI) layer 3 protocol operations, OSI layer 4 protocol operations, and/or OSI layer 5 protocol operations.

40. The system according to claim 31, wherein said handling by said single network interface circuitry on behalf of one or both of: a GOS and/or TGOS comprises one or both of: TCP operations and/or IP operations.

41. The system according to claim 31, wherein said single network interface circuitry is operable to executes on behalf of one or both of: a GOS and/or TGOS, link layer network protocol operations.

42. A system for communicating via a network, the system comprising:
a single network interface circuitry that is shared by a plurality of guest operating systems (GOSs), wherein said single network interface circuitry provides access to a network, and handling processing of one or both of: data to be transmitted to a network and/or data received from a network, through a trusted guest operating system (TGOS) by said single network interface circuitry for each of said plurality of GOSs handling processing of said one or both of: said data to be transmitted to said network and/or said data received from said network.

43. The system according to claim 42, wherein said handling of processing by said single network interface circuitry is on behalf of one or both of: a GOS and/or TGOS comprises one or more of: open systems interconnection (OSI) layer 2 protocol operations, OSI layer 3 protocol operations, OSI layer 4 protocol operations, and/or OSI layer 5 protocol operations.

44. The system according to claim 42, wherein said single network interface circuitry is operable to copy data directly between a buffer for one of said plurality of GOSs to a buffer in said single network interface circuitry.

45. The system according to claim 42, wherein said single network interface circuitry is operable to copy data between a buffer for one of said plurality of GOSs to a buffer in said single network interface circuitry via an intermediate buffer in said TGOS.

* * * * *

UNITED STATES PATENT AND TRADEMARK OFFICE
CERTIFICATE OF CORRECTION

PATENT NO. : 8,549,098 B2
APPLICATION NO. : 11/623011
DATED : October 1, 2013
INVENTOR(S) : Eliezer Aloni et al.

Page 1 of 1

It is certified that error appears in the above-identified patent and that said Letters Patent is hereby corrected as shown below:

In the Claims

In column 26, line 55, after "is operable to" replace "handles" with --handle--.

In column 27, line 27, after "is operable to" replace "executes" with --execute--.

Signed and Sealed this
Twelfth Day of November, 2013

Teresa Stanek Rea
*Deputy Director of the United States Patent and Trademark Office*